United States Patent
Kim et al.

(10) Patent No.: US 10,749,903 B2
(45) Date of Patent: *Aug. 18, 2020

(54) TRANSMISSION/RECEPTION APPARATUS OF SECURITY GATEWAY FOR PHYSICAL UNIDIRECTIONAL COMMUNICATION PERFORMING SECURITY TUNNELING AND DATA RE-TRANSMISSION, AND DATA TRANSMISSION METHOD USING SAME

(71) Applicant: NNSP Co., Ltd., Seoul (KR)

(72) Inventors: Ki-Hyun Kim, Yongin-si (KR); Eun Sung Na, Yongin-si (KR); Il-Yong Kim, Yongin-si (KR)

(73) Assignee: NNSP CO., LTD., Seoul (KR)

( * ) Notice: Subject to any disclaimer, the term of this patent is extended or adjusted under 35 U.S.C. 154(b) by 189 days.

This patent is subject to a terminal disclaimer.

(21) Appl. No.: 15/525,567

(22) PCT Filed: Feb. 2, 2016

(86) PCT No.: PCT/KR2016/001143
§ 371 (c)(1),
(2) Date: May 9, 2017

(87) PCT Pub. No.: WO2016/163634
PCT Pub. Date: Oct. 13, 2016

(65) Prior Publication Data
US 2017/0339191 A1    Nov. 23, 2017

(30) Foreign Application Priority Data
Apr. 6, 2015 (KR) .......................... 10-2015-0048499

(51) Int. Cl.
*H04L 29/06* (2006.01)
*H04L 29/08* (2006.01)
(Continued)

(52) U.S. Cl.
CPC ................ *H04L 63/20* (2013.01); *H04L 1/20* (2013.01); *H04L 9/32* (2013.01); *H04L 9/3236* (2013.01);
(Continued)

(58) Field of Classification Search
None
See application file for complete search history.

(56) References Cited

U.S. PATENT DOCUMENTS 3,879,577 A * 4/1975 Progler ................. H04L 1/1809
178/23 A
7,562,285 B2 * 7/2009 Yang .................... G06F 13/4286
714/815

(Continued)

*Primary Examiner* — Kambiz Zand
*Assistant Examiner* — Arezoo Sherkat
(74) *Attorney, Agent, or Firm* — Goldilocks Zone IP Law

(57) ABSTRACT

The present invention provides a reception apparatus for performing security tunneling and data re-transmission and unidirectionally receiving data from a transmission apparatus and a transmission apparatus for unidirectionally transmitting data to the reception apparatus. When the reception apparatus checks that there is an error in received data, the reception apparatus performs a switching operation or transmits a switching request signal to the transmission apparatus to notify of the error of the received data to the transmission apparatus. When the transmission apparatus has detected the switching, the transmission apparatus re-transmits data, in which an error is generated, to the reception apparatus. The transmission apparatus encrypts the data and transmits the encrypted data to the reception apparatus. According to the present invention, reliability and security of one-unidirectional data communication are improved.

13 Claims, 11 Drawing Sheets

(51) Int. Cl.
*H04L 9/32* (2006.01)
*H04L 1/20* (2006.01)
*H04L 12/66* (2006.01)
*H04L 12/22* (2006.01)
*H04L 12/939* (2013.01)

(52) U.S. Cl.
CPC .............. *H04L 12/22* (2013.01); *H04L 12/66* (2013.01); *H04L 29/06* (2013.01); *H04L 63/0428* (2013.01); *H04L 63/123* (2013.01); *H04L 67/28* (2013.01); *H04L 49/55* (2013.01); *H04L 2209/34* (2013.01)

(56) References Cited

U.S. PATENT DOCUMENTS

| | | | |
|---|---|---|---|
| 8,276,035 B1* | 9/2012 | Savarese | H04L 1/0007 714/749 |
| 2010/0005358 A1* | 1/2010 | Lim | H04L 1/1829 714/749 |
| 2011/0078529 A1* | 3/2011 | Wu | H04L 1/1812 714/748 |
| 2013/0101121 A1* | 4/2013 | Nordholt | H04L 9/0852 380/279 |
| 2014/0317753 A1* | 10/2014 | Frenkel | H04L 63/10 726/26 |

* cited by examiner

TRANSMISSION/RECEPTION APPARATUS OF SECURITY GATEWAY FOR PHYSICAL UNIDIRECTIONAL COMMUNICATION PERFORMING SECURITY TUNNELING AND DATA RE-TRANSMISSION, AND DATA TRANSMISSION METHOD USING SAME

CROSS REFERENCE TO RELATED PATENT APPLICATIONS

This application claims the benefit under 35 U.S.C. Section 371, of PCT International Application No. PCT/KR2016/001143, filed Feb. 2, 2016, which claimed priority to Korean Patent Application No. KR 10-2015-0048499, filed Apr. 6, 2015, the disclosures of which are hereby incorporated by the references.

TECHNICAL FIELD

The present invention relates to a security communication technology, and more particularly, to a transmission apparatus for transmitting data in one direction to a reception apparatus, a reception apparatus for receiving data in one direction from a transmission apparatus, and a method of transmitting data in one direction using transmission and reception apparatuses.

BACKGROUND ART

Recently, data communication using a communication apparatus has been performed in a variety of fields. Data communication can be classified into various types according to communication types. For example, when two-way data communication is performed between a first communication apparatus and a second communication apparatus, the first communication apparatus can transmit data to the second communication apparatus, and the second communication apparatus can also transmit data to the first communication apparatus. In other words, when two-way data communication is performed, the two communication apparatuses can exchange data.

On the other hand, when one-way data communication is performed between a first communication apparatus and a second communication apparatus, the first communication apparatus can transmit data to the second communication apparatus, but the second communication apparatus cannot transmit data to the first communication apparatus. In other words, when one-way data communication is performed, since the first communication apparatus operates as a transmission apparatus and the second communication apparatus operates as a reception apparatus, data can be transmitted in only one direction.

A communication apparatus can receive data from another communication apparatus and determine whether there is an error in the received data. Here, there may be an error in the received data. When two-way data communication is performed, the communication apparatus can notify the other communication apparatus of the data error and transfer information on the data error. However, when one-way data communication is performed, the reception apparatus cannot transfer information on the data error to the transmission apparatus. This is because data is transmitted in only one direction.

To solve this problem in one-way data communication, several methods have been proposed. As an example, a method in which a transmission apparatus adds information that can be used for self error recovery to data and transmits the data to a reception apparatus, and when there is an error in the received data, the reception apparatus performs self error recovery with reference to the added information has been proposed. However, according to this method, it takes a long time to encode and decode information used for self error recovery, and data may be unnecessarily duplicated. Further, an error deviating from a range in which self error recovery is possible cannot be corrected.

As another example, a method in which a separate communication link is added between a transmission apparatus and a reception apparatus to transfer a result of detecting a data error from the reception apparatus to the transmission apparatus has been proposed. However, according to this method, the communication link is used in a reverse direction with respect to a communication link used for one-way data communication. Therefore, characteristics of one-way data communication deteriorate.

DISCLOSURE

Technical Problem

To solve the above problems, an apparatus and method for providing a notification of an error in data transmitted through one-way data communication in an easy way without degrading characteristics of one-way data communication are provided. In embodiments of the present invention, when an error occurs in transmitted data, at least one of a transmission apparatus and a reception apparatus can switch the connection between the transmission apparatus and the reception apparatus. When the reception apparatus senses switching, it is possible to re-transmit the data in which the error has occurred. Further, the transmission apparatus can encrypt the data using an encryption key and then transmit the encrypted data to the reception apparatus. Accordingly, a security tunnel can be established between the transmission apparatus and the reception apparatus.

Technical Solution

One aspect of the present invention provides a reception apparatus configured to receive data in one direction from a transmission apparatus, the reception apparatus including: a reception unit including a receiver configured to receive encoded and encrypted target data from the transmission apparatus via a reception terminal; an error detection unit configured to decrypt and decode the target data using a cipher key and examine whether there is an error in the decrypted and decoded target data; a switchover control unit configured to control switching of a connection between at least one of the reception terminal and a transmission terminal, which is configured to be connected to the receiver via a switch, and the receiver when the error detection unit determines that there is an error in the decrypted and decoded target data; and a reception data buffer configured to acquire the decrypted and decoded target data when the error detection unit determines that there is no error in the decrypted and decoded target data.

As an embodiment, the reception unit may further include a transmitter, and the transmitter may not be connected to the transmission terminal.

As an embodiment, the target data may include an integrity value generated by the transmission apparatus, and the error detection unit may examine whether there is an error in the decrypted and decoded target data with reference to the integrity value.

As an embodiment, when the error detection unit determines that there is an error in the decrypted and decoded target data, the connection between the reception terminal and the receiver may be switched under control of the switchover control unit, and after the connection between the reception terminal and the receiver is restored under control of the switchover control unit, the reception unit may re-receive the target data via the reception terminal using the receiver.

As an embodiment, when the error detection unit determines that there is an error in the decrypted and decoded target data, the connection between the transmission terminal and the receiver may be switched under control of the switchover control unit, and the reception unit may re-receive the target data via the reception terminal using the receiver.

As an embodiment, the switchover control unit may physically switch the connection between the receiver, and the at least one of the reception terminal and the transmission terminal.

As an embodiment, the switchover control unit may control switching of the connection between the receiver, and the at least one of the reception terminal and the transmission terminal by cutting off power supplied to the receiver or providing a function termination command to the receiver.

Another aspect of the present invention provides a transmission apparatus configured to transmit data in one direction to a reception apparatus, the transmission apparatus including: a transmission data buffer configured to buffer preceding data which will be transmitted to the reception apparatus; an encoding unit configured to encode the preceding data together with an integrity value used to detect an error in the preceding data and encrypt the encoded preceding data using a cipher key; a transmission unit including a transmitter configured to transmit the encoded and encrypted preceding data to the reception apparatus via a transmission terminal; and a switchover sensing unit configured to sense whether a connection to the reception apparatus via at least one of the transmission terminal and a reception terminal has been switched. In this embodiment, when the switchover sensing unit senses that the connection to the reception apparatus has been switched, the encoding unit may perform operations for re-transmitting the preceding data to the reception apparatus.

As an embodiment, the transmission unit may further include a receiver, and the receiver may not be connected to the reception terminal.

As an embodiment, the transmission data buffer may further buffer following data which will be transmitted to the reception apparatus subsequent to the preceding data. In this embodiment, when the switchover sensing unit senses that the connection to the reception apparatus has been switched, the encoding unit may encode combined data including the preceding data and the following data together with an integrity value used to detect an error in the combined data and encrypt the encoded combined data using the cipher key, and the transmission unit may transmit the encoded and encrypted combined data to the reception apparatus via the transmission terminal using the transmitter.

As an embodiment, the transmission data buffer may further buffer following data which will be transmitted to the reception apparatus subsequent to the preceding data. In this embodiment, when the switchover sensing unit senses that the connection to the reception apparatus has not been switched, the encoding unit may encode the following data together with an integrity value used to detect an error in the following data and encrypt the encoded following data using the cipher key, and the transmission unit may transmit the encoded and encrypted following data to the reception apparatus via the transmission terminal using the transmitter.

As an embodiment, the switchover sensing unit may include a sensing circuit configured to sense an electrical signal of a communication line used for the connection to the reception apparatus.

As an embodiment, the switchover sensing unit may be implemented by providing the transmitter with a function of recognizing a connection state of the connection to the reception apparatus.

Another aspect of the present invention provides a method of transmitting data in one direction to a reception apparatus using a transmission apparatus, the method including: acquiring first data which will be transmitted to the reception apparatus; encoding the first data together with a first integrity value used to detect an error in the first data; encrypting the encoded first data using a first cipher key; transmitting the encoded and encrypted first data to the reception apparatus via a transmission terminal of the transmission apparatus; sensing whether a connection to the reception apparatus via at least one of the transmission terminal and a reception terminal of the transmission apparatus has been switched; encoding second data including the first data together with a second integrity value used to detect an error in the second data when it is sensed that the connection to the reception apparatus has been switched; encrypting the encoded second data using a second cipher key; and transmitting the encoded and encrypted second data to the reception apparatus via the transmission terminal.

As an embodiment, the method of transmitting data in one direction to a reception apparatus using a transmission apparatus may further include: acquiring third data which will be transmitted to the reception apparatus subsequent to the first data; when it is sensed that the connection to the reception apparatus has not been switched, encoding the third data together with a third integrity value used to detect an error in the third data; encrypting the encoded third data using a third cipher key; and transmitting the encoded and encrypted third data to the reception apparatus via the transmission terminal.

Another aspect of the present invention provides a method of receiving data in one direction from a transmission apparatus using a reception apparatus, the method including: receiving encoded and encrypted first data from the transmission apparatus via a reception terminal of the reception apparatus; decrypting and decoding the first data using a cipher key and acquiring an integrity value included in the first data; examining whether there is an error in the decrypted and decoded first data with reference to the integrity value; when it is determined that there is an error in the decrypted and decoded first data, switching a connection between a receiver, and at least one of the reception terminal and a transmission terminal of the reception apparatus of the reception apparatus; and after the connection between the receiver, and the at least one of the reception terminal and the transmission terminal is switched, receiving second data including the first data from the transmission apparatus.

As an embodiment, the method of receiving data in one direction from a transmission apparatus using a reception apparatus may further include acquiring the decrypted and decoded first data when it is determined that there is no error in the decrypted and decoded first data.

Another aspect of the present invention provides a transmission apparatus configured to transmit data in one direction to a reception apparatus, the transmission apparatus including: a transmission data buffer configured to buffer preceding data which will be transmitted to the reception apparatus; an encoding unit configured to encode the preceding data together with an integrity value used to detect an error in the preceding data and encrypt the encoded preceding data using a cipher key; a transmission unit including a transmitter configured to transmit the encoded and encrypted preceding data to the reception apparatus via a transmission terminal, and configured to receive a switching request signal from the reception apparatus via a reception terminal; a switchover control unit configured to control switching of a connection between at least one of the transmitter and a receiver, which is configured to be connected to the transmission terminal via a switch, and the transmission terminal in response to the switching request signal; and a switchover sensing unit configured to sense whether the connection between the transmission terminal, and the at least one of the transmitter and the receiver has been switched. In this embodiment, when the switchover sensing unit senses that the connection between the transmission terminal, and the at least one of the transmitter and the receiver has been switched, the encoding unit may perform operations for re-transmitting the preceding data to the reception apparatus.

As an embodiment, the transmission data buffer may further buffer following data which will be transmitted to the reception apparatus subsequent to the preceding data. In this embodiment, the connection between the transmitter and the transmission terminal may be switched under control of the switchover control unit when the switching request signal is provided, the encoding unit may encode combined data including the preceding data and the following data together with an integrity value used to detect an error in the combined data and encrypt the encoded combined data using the cipher key after the switchover sensing unit senses switching of the connection between the transmitter and the transmission terminal, and the transmission unit may transmit the encoded and encrypted combined data to the reception apparatus via the transmission terminal using the transmitter after the connection between the transmitter and the transmission terminal is restored under control of the switchover control unit.

As an embodiment, the transmission data buffer may further buffer following data which will be transmitted to the reception apparatus subsequent to the preceding data. In this embodiment, when the switching request signal is provided, the connection between the receiver and the transmission terminal may be switched under control of the switchover control unit, and after the switchover sensing unit senses switching of the connection between the receiver and the transmission terminal, the encoding unit may encode combined data including the preceding data and the following data together with an integrity value used to detect an error in the combined data and encrypt the encoded combined data using the cipher key, and the transmission unit may transmit the encoded and encrypted combined data to the reception apparatus via the transmission terminal using the transmitter.

Another aspect of the present invention provides a method of transmitting data in one direction to a reception apparatus using a transmission apparatus, the method including: acquiring first data which will be transmitted to the reception apparatus; encoding the first data together with a first integrity value used to detect an error in the first data; encrypting the encoded first data using a first cipher key; transmitting the encoded and encrypted first data to the reception apparatus via a transmission terminal of the transmission apparatus; when a switching request signal is provided from the reception apparatus via a reception terminal of the transmission apparatus, switching a connection between the transmission terminal, and at least one of a transmitter and a receiver of the transmission apparatus; sensing whether the connection between the transmission terminal, and the at least one of the transmitter and the receiver has been switched; when it is sensed that the connection between the transmission terminal, and the at least one of the transmitter and the receiver has been switched, encoding second data including the first data together with a second integrity value used to detect an error in the second data; encrypting the encoded second data using a second cipher key; and transmitting the encoded and encrypted second data to the reception apparatus via the transmission terminal.

As an embodiment, information on the first and second cipher keys may be previously stored in each of the transmission apparatus and the reception apparatus.

As an embodiment, the method of transmitting data in one direction to a reception apparatus using a transmission apparatus may further include, when an update condition for updating at least one of the first and second cipher keys is satisfied, transmitting an update key to the reception apparatus via the transmission terminal using the transmitter.

Advantageous Effects

According to embodiments of the present invention, in one-way data communication, the occurrence of a data error can be easily recognized. Further, since data in which the error has occurred is re-transmitted, it is possible to prevent data loss and improve reliability of the one-way data communication. Also, the data is encrypted and transmitted, and thus security of the one-way data communication can be improved. In particular, even when a transmission apparatus and a reception apparatus are far away from each other, safe one-way data communication can be performed by establishing a security tunnel.

In some embodiments, an integrity value can be used to examine whether there is an error in data. In this way, in comparison with a case in which self error recovery is used, complexity of data encoding and decoding is lowered, so that calculation speed can be improved. Therefore, a time required to encode and decode the data can be reduced.

BEST MODE OF THE INVENTION

Figure 2:
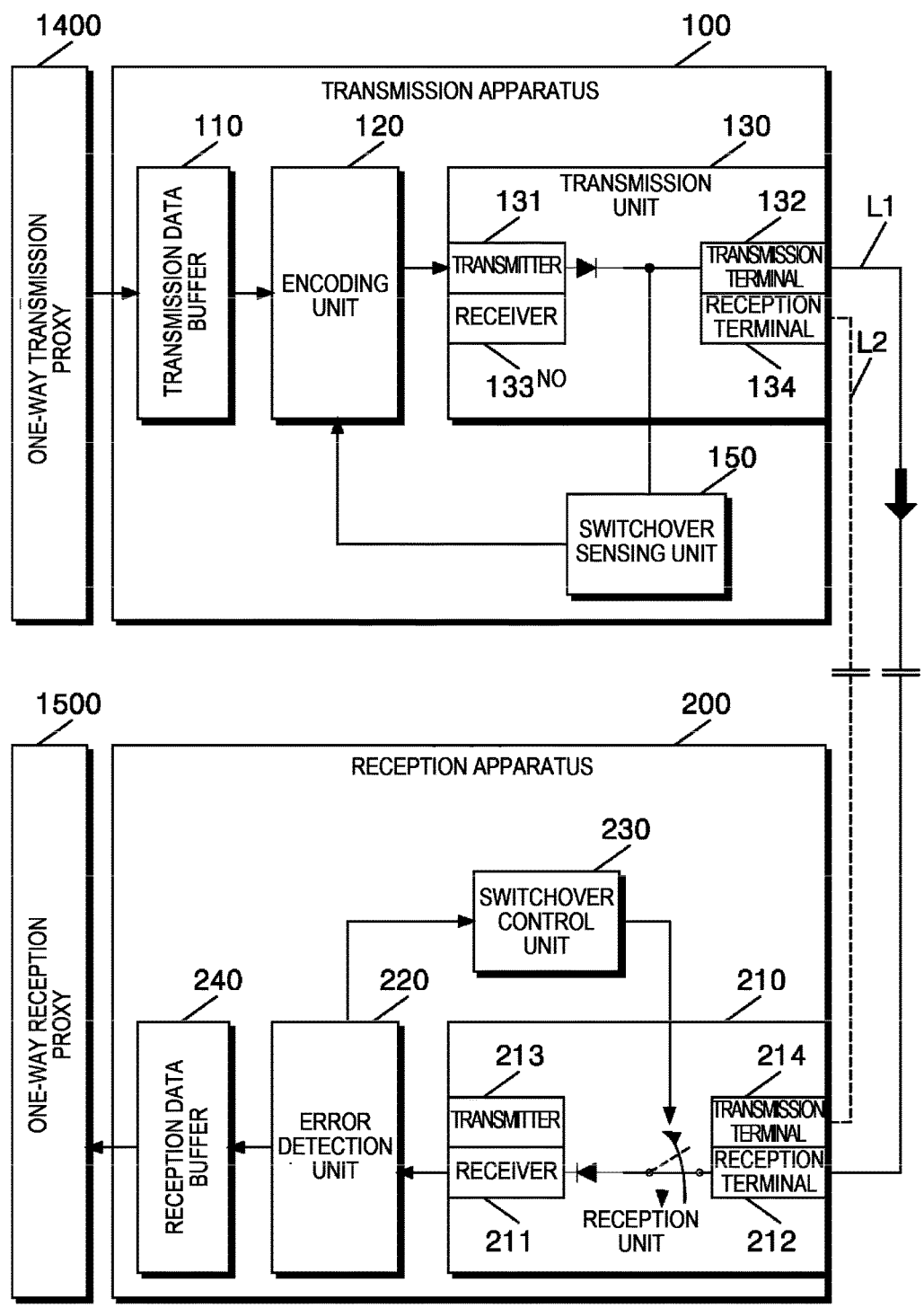
FIG. 2 is a block diagram showing an embodiment of configurations of the transmission apparatus and the reception apparatus of FIG. 1.

FIG. 2 shows the best mode for implementing the present invention.

MODES OF THE INVENTION

Both the aforementioned features and the following detailed description are examples for helping description and understanding of the present invention. In other words, the present invention is not limited to such embodiments and can be embodied in other forms. The following embodiments are mere examples for the complete disclosure of the present invention and descriptions for conveying the present invention to those of ordinary skill in the art to which the present invention pertains. Accordingly, when there are several methods for implementing components of the present invention, it is apparent that the present invention can be embodied using a specific one of the methods or the equivalent.

As used herein, when a component is referred to as including specific elements or a process is referred to as including specific operations, elements or operations other than the specific elements or operations can be further included. In other words, the terminology used herein is for the purpose of describing particular embodiments only and is not intended to be limiting of the concept of the present invention. Further, examples described to help understanding of the present invention include complementary embodiments thereof.

Terms used herein have the same meanings as commonly understood by those of ordinary skill in the art to which the present invention pertains. The generally used terms should be understood according to meanings consistent with the context herein. Also, the terms used herein should not be interpreted in an idealized or overly formal sense unless meanings thereof are clearly defined. Hereinafter, embodiments of the present invention will be described with reference to the accompanying drawings.

Figure 1:
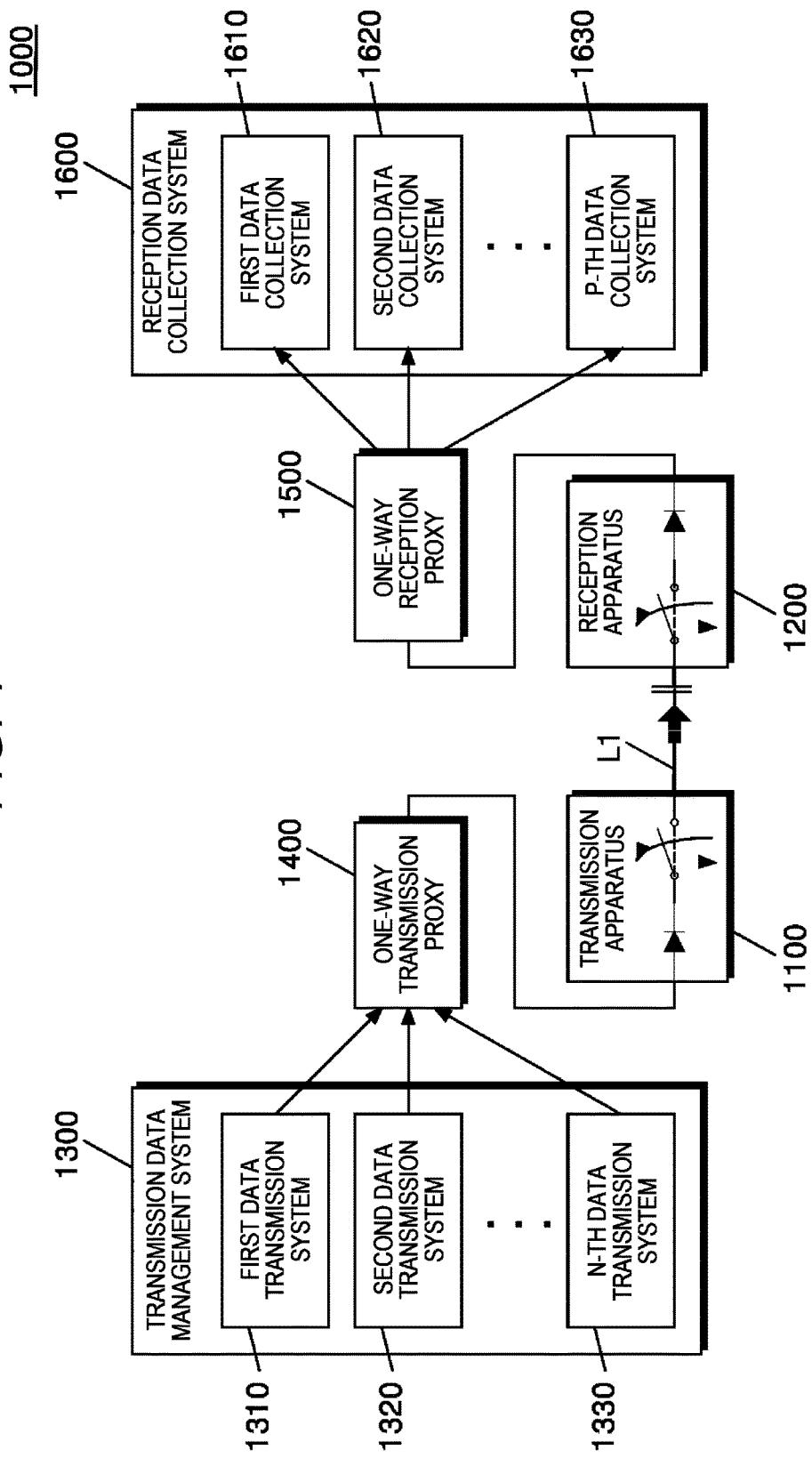
FIG. 1 is a block diagram of a one-way data communication system including a transmission apparatus and a reception apparatus according to an embodiment of the present invention.

FIG. 1 is a block diagram of a one-way data communication system including a transmission apparatus and a reception apparatus according to an embodiment of the present invention. Referring to FIG. 1, a one-way data communication system 1000 can include a transmission apparatus 1100, a reception apparatus 1200, a transmission data management system 1300, a one-way transmission proxy 1400, a one-way reception proxy 1500, and a reception data collection system 1600.

In an embodiment of the present invention, one-way data communication can be performed between the transmission apparatus 1100 and the reception apparatus 1200. The transmission apparatus 1100 can transmit data in one direction to the reception apparatus 1200. The reception apparatus 1200 can receive data in one direction from the transmission apparatus 1100. To this end, the connection of a communication line L1 for transmitting data from the transmission apparatus 1100 to the reception apparatus 1200 can be maintained.

On the other hand, the reception apparatus 1200 cannot transmit data to the transmission apparatus 1100. To this end, in some embodiments, a communication line directed from the reception apparatus 1200 to the transmission apparatus 1100 can be physically disconnected. Alternatively, in some embodiments, a communication line (not shown) directed from the reception apparatus 1200 to the transmission apparatus 1100 can be provided, but a data transmission path can be physically disconnected in at least one of the transmission apparatus 1100 and the reception apparatus 1200. Embodiments relating to physical disconnection will be described in further detail below.

When an error occurs in data transmitted from the transmission apparatus 1100 to the reception apparatus 1200, the reception apparatus 1200 cannot transfer information on the data error to the transmission apparatus 1100. This is because data is transmitted in only one direction. Therefore, in an embodiment of the present invention, when an error occurs in transmitted data, at least one of the transmission apparatus 1100 and the reception apparatus 1200 can switch the connection between the transmission apparatus 1100 and the reception apparatus 1200. When the transmission apparatus 1100 senses switching, it is possible to re-transmit the data in which the error has occurred. Embodiments in which the reception apparatus 1200 switches the connection will be described with reference to FIGS. 2 to 6. Embodiments in which the transmission apparatus 1100 switches the connection will be described with reference to FIGS. 7 to 11.

For example, the transmission apparatus 1100 and the reception apparatus 1200 can communicate according to one or more communication protocols using an RJ-45 or an RS-232 connector. However, the present invention is not limited to this example. In another example, the transmission apparatus 1100 and the reception apparatus 1200 can communicate according to an optical communication protocol. In still another example, the transmission apparatus 1100 and the reception apparatus 1200 can communicate according to one or more of various communication protocols, such as Universal Serial Bus (USB), Firewire, and so on. Embodiments of the present invention can be variously changed or modified as necessary.

The transmission data management system 1300 can include one or more data transmission systems 1310, 1320, and 1330. Each of the data transmission systems 1310, 1320, and 1330 can manage data to be transferred to the reception data collection system 1600 via the one-way transmission proxy 1400 and the transmission apparatus 1100.

The one-way transmission proxy 1400 can acquire data from at least one of the data transmission systems 1310, 1320, and 1330 in communication with the transmission data management system 1300. The one-way transmission proxy 1400 can examine whether communication between each of the data transmission systems 1310, 1320, and 1330 and the transmission apparatus 1100 has been permitted. The one-way transmission proxy 1400 can acquire data from a permitted data transmission system. To transfer data from the transmission data management system 1300 to the reception data collection system 1600, the transmission apparatus 1100 can acquire data from at least one of the data transmission systems 1310, 1320, and 1330 via the one-way transmission proxy 1400.

In FIG. 1, the one-way transmission proxy 1400 is shown as a component separate from the transmission apparatus 1100. However, in some embodiments, the one-way transmission proxy 1400 can be included in the transmission apparatus 1100, unlike in FIG. 1.

Data can be provided to the one-way reception proxy 1500 from the reception apparatus 1200. The one-way reception proxy 1500 can transfer data provided from the reception apparatus 1200 to at least one of data collection systems 1610, 1620, and 1630 in communication with the reception data collection system 1600. The one-way reception proxy 1500 can examine whether communication between each of the data collection systems 1610, 1620, and 1630 and the reception apparatus 1200 has been permitted. The one-way reception proxy 1500 can transfer data to a permitted data collection system.

In FIG. 1, the one-way reception proxy 1500 is shown as a component separate from the reception apparatus 1200. However, in some embodiments, the one-way reception proxy 1500 can be included in the reception apparatus 1200, unlike in FIG. 1.

The reception data collection system 1600 can include one or more data collection systems 1610, 1620, and 1630. The reception apparatus 1200 can acquire data received from the transmission apparatus 1100 and transfer the acquired data to at least one of the data collection systems 1610, 1620, and 1630 via the one-way reception proxy 1500. Each of the data collection systems 1610, 1620, and 1630 can store data received via the reception apparatus 1200 and the one-way reception proxy 1500.

FIG. 2 is a block diagram showing an embodiment of configurations of the transmission apparatus and the reception apparatus of FIG. 1. The transmission apparatus 1100 of FIG. 1 can include a transmission apparatus 100 of FIG. 2. The reception apparatus 1200 of FIG. 1 can include a reception apparatus 200 of FIG. 2. FIG. 2 shows an embodiment in which the reception apparatus 200 switches the connection between the transmission apparatus 100 and the reception apparatus 200.

The transmission apparatus 100 can include a transmission data buffer 110, an encoding unit 120, a transmission unit 130, and a switchover sensing unit 150. The transmission apparatus 100 can acquire data from at least one of the data transmission systems 1310, 1320, and 1330 of FIG. 1 via the one-way transmission proxy 1400.

The data can be provided to the transmission data buffer 110 from the one-way transmission proxy 1400. The transmission data buffer 110 can buffer data to be transmitted to the reception apparatus 200. The transmission data buffer 110 can provide the buffered data to the encoding unit 120.

In some embodiments, the timing at which the data is output from the transmission apparatus 100 and the timing at which the reception apparatus 200 receives the data may not be exactly the same. The transmission data buffer 110 can buffer the data to synchronize the timing at which the data is output from the transmission apparatus 100 and the timing at which the reception apparatus 200 receives the data. A time in which the transmission data buffer 110 buffers the data can be adjusted to be suitable for the synchronization.

When an error occurs in the data received by the reception apparatus 200, the transmission apparatus 100 can re-transmit the data in which the error has occurred to the reception apparatus 200, which will be further described below. To prepare for a case in which the data is re-transmitted to the reception apparatus 200, the transmission data buffer 110 can store the already transmitted data for an appropriate time. When it is necessary to re-transmit the data to the reception apparatus 200, the data to be re-transmitted can be provided to the encoding unit 120 from the transmission data buffer 110.

For example, the transmission data buffer 110 can temporarily store the data in a database form. Alternatively, the transmission data buffer 110 can temporarily store the data in the form of a file or a simple binary bit string. The implementation form of the transmission data buffer 110 can be variously changed or modified as necessary.

The data can be provided to the encoding unit 120 from the transmission data buffer 110. The encoding unit 120 can encode the provided data using an encoding technique. In an embodiment, the encoding unit 120 can generate an integrity value used by the reception apparatus 200 to detect an error in the data. In this embodiment, the encoding unit 120 can encode the provided data together with the integrity value.

The encoding unit 120 can generate the integrity value using an integrity cipher algorithm. For example, the integrity value can include a hash value which is generated by performing a hash operation on the data. However, the present invention is not limited to this example. The integrity value can include any value that is used to detect an error in the data, such as a parity value, a value calculated according to a cyclic redundancy check (CRC) algorithm, and so on In embodiments of the present invention, an integrity value is used to examine whether there is an error in data. Therefore, in comparison with a case in which self error recovery is used, complexity of data encoding and decoding is lowered, and calculation speed can be improved. Consequently, a time required to encode and decode the data can be reduced.

In embodiments of the present invention, the encoding unit 120 can encrypt the encoded data. For example, the encoding unit 120 can encrypt the encoded data using a cipher key. In this way, the transmission apparatus 100 can transmit the encrypted data to the reception apparatus 200, and a security tunnel can be established between the transmission apparatus 100 and the reception apparatus 200. In other words, it is possible to achieve the same effect as establishment of a virtual private network between the transmission apparatus 100 and the reception apparatus 200. Therefore, security of the one-way data communication can be improved. The encoding unit 120 can provide the encoded and encrypted data to the transmission unit 130.

In an embodiment, the cipher key can be a symmetric key. Since one-way data communication is performed between the transmission apparatus 100 and the reception apparatus 200, the cipher key can be previously defined and stored in each of the transmission apparatus 100 and the reception apparatus 200. The reception apparatus 200 can decrypt received data using the cipher key, which will be described below. For example, the cipher key can be a session key. The cipher key can be configured to be valid only in each session of one-way data communication performed between the transmission apparatus 100 and the reception apparatus 200. However, this embodiment and example are for helping understanding of the present invention and do not limit the present invention.

The transmission unit 130 can include a transmitter 131 and a transmission terminal 132. The encoded and encrypted data can be provided to the transmitter 131 from the encoding unit 120. The transmission terminal 132 can be connected to a reception terminal 212 of the reception apparatus 200 via a one-way data transmission line L1. The transmitter 131 can transmit the encoded and encrypted data to the reception apparatus 200 via the transmission terminal 132.

The transmission unit 130 can further include a receiver 133 and a reception terminal 134. In some embodiments, the reception terminal 134 can be physically disconnected from a transmission terminal 214 of the reception apparatus 200. Therefore, the reception apparatus 200 may not transmit data to the transmission apparatus 100, and one-way data communication can be performed between the transmission apparatus 100 and the reception apparatus 200.

Alternatively, in some other embodiments (e.g., a case in which the transmission apparatus 100 and the reception apparatus 200 operate in an environment employing a two-way data communication protocol, such as transfer control protocol/Internet protocol (TCP/IP)), the reception terminal 134 and the transmission terminal 214 of the reception apparatus 200 can be connected via a separate line L2. However, in these embodiments, a transmission path between the receiver 133 and the reception terminal 134 may be physically disconnected, and the receiver 133 may not be connected to the reception terminal 134. Therefore, the transmission apparatus 100 may not receive data from the reception apparatus 200 regardless of which embodiment is implemented. In a certain embodiment, the transmission unit 130 may not include the receiver 133. Alternatively, the function of the receiver 133 may not be carried out.

The switchover sensing unit 150 can sense whether a connection to the reception apparatus 200 via at least one of the transmission terminal 132 and the reception terminal 134 has been switched. A configuration and operations of the switchover sensing unit 150 will be further described below.

The reception apparatus 200 can include a reception unit 210, an error detection unit 220, a switchover control unit 230, and a reception data buffer 240. The reception apparatus 200 can receive data from the transmission apparatus 100 via the one-way data transmission line L1. The reception apparatus 200 can transfer the data to at least one of the data collection systems 1610, 1620, and 1630 of FIG. 1 via the one-way reception proxy 1500.

The reception unit 210 can include a receiver 211 and the reception terminal 212. The reception terminal 212 can be connected to the transmission terminal 132 of the transmission apparatus 100 via the one-way data transmission line L1. The receiver 211 can receive the encoded and encrypted data from the transmission apparatus 100 via the reception terminal 212.

The reception unit 210 can further include the transmitter 213 and the transmission terminal 214. In some embodiments, the transmission terminal 214 can be physically disconnected from the reception terminal 134 of the transmission apparatus 100. Therefore, the reception apparatus 200 may not transmit data to the transmission apparatus 100, and one-way data communication can be performed between the transmission apparatus 100 and the reception apparatus 200.

Alternatively, in some other embodiments, the transmission terminal 214 and the reception terminal 134 of the transmission apparatus 100 can be connected via the separate line L2. However, in these embodiments, a transmission path between the transmitter 213 and the transmission terminal 214 may be physically disconnected, and the transmitter 213 may not be connected to the transmission terminal 214. Therefore, the transmission apparatus 100 may not receive data from the reception apparatus 200 regardless of which embodiment is implemented. In a certain embodiment, the reception unit 210 may not include the transmitter 213. Alternatively, functions of the transmitter 413 may not be carried out.

The encoded and encrypted data can be provided to the error detection unit 220 from the receiver 211 of the reception unit 210. For example, the error detection unit 220 can decrypt the encoded and encrypted data using the cipher key. Further, the error detection unit 220 can decode the decrypted data using a decoding technique corresponding to the encoding technique used by the encoding unit 120. The error detection unit 220 can examine whether there is an error in the decrypted and decoded data.

In an embodiment, as mentioned above, the data received by the reception apparatus 200 can include the integrity value generated by the transmission apparatus 100, more specifically, the encoding unit 120. In this embodiment, the error detection unit 220 can examine whether there is an error in the decrypted and decoded data with reference to the integrity value.

For example, when the integrity value includes a hash value, the error detection unit 220 can determine whether an integrity value calculated by performing a hash operation on the decrypted and decoded data is identical to the received integrity value. When the calculated integrity value is not identical to the received integrity value, the error detection unit 220 can determine that there is an error in the received data. However, this example is merely for helping understanding of the present invention and does not limit the present invention.

The switchover control unit 230 can control switching of the connection between the receiver 211, and at least one of the reception terminal 212 and the transmission terminal 214. More specifically, when the error detection unit 220 determines that there is an error in the decrypted and decoded data, the switchover control unit 230 can switch the connection between the receiver 211, and at least one of the reception terminal 212 and the transmission terminal 214.

As described above, the reception apparatus 200 cannot transmit data to the transmission apparatus 100. Therefore, the reception apparatus 200 cannot directly notify the transmission apparatus 100 of a data error. However, in embodiments of the present invention, the reception apparatus 200 can notify the transmission apparatus 100 that there is an error in data by switching the connection between the receiver 211, and at least one of the reception terminal 212 and the transmission terminal 214 with the switchover control unit 230.

In an embodiment, the switchover control unit 230 can physically switch the connection between the receiver 211, and at least one of the reception terminal 212 and the transmission terminal 214. For example, the switchover control unit 230 can close or open a switching element or circuit between the receiver 211, and the reception terminal 212 and/or the transmission terminal 214. However, the present invention is not limited to this example. In another example, another component, such as a transistor, a relay circuit, or a gate circuit, can be connected between the receiver 211 and the reception terminal 212 and/or the transmission terminal 214.

In another embodiment, the switchover control unit 230 can control switching of the connection between the receiver 211, and at least one of the reception terminal 212 and the transmission terminal 214 by cutting off power supplied to the receiver 211. Alternatively, the switchover control unit 230 can control switching of the connection between the receiver 211, at least one of the reception terminal 212 and the transmission terminal 214 by providing a function termination command to the receiver 211. This is because the same operation as switching the connection between the receiver 211, and at least one of the reception terminal 212 and the transmission terminal 214 can be performed when the power supplied to the receiver 211 or the function of the receiver 211 is terminated.

In an embodiment, when the error detection unit 220 determines that there is an error in the decrypted and decoded data, the error detection unit 220 can directly control the switchover control unit 230. In another embodiment, when the error detection unit 220 determines that there is an error in the decrypted and decoded data, the error detection unit 220 can output a control signal. A separately provided controller or processor (not shown) can control the switchover control unit 230 in response to the control signal.

The switchover sensing unit 150 can sense switching of the connection to the reception apparatus 200 (i.e., the connection between the receiver 211, and at least one of the reception terminal 212 and the transmission terminal 214). In this way, the transmission apparatus 100 can recognize that an error has occurred in the data received by the reception apparatus 200. When the switchover sensing unit 150 senses that the connection to the reception apparatus 200 has been switched, the data in which the error has occurred can be re-transmitted to the reception apparatus 200, and the reception apparatus 200 can re-receive the data in which the error has occurred. Therefore, data loss can be prevented, and reliability of the one-way data communication can be improved.

In an embodiment, the switchover sensing unit 150 can be configured separately from other components included in the transmission apparatus 100. In this embodiment, the switchover sensing unit 150 can include a sensing circuit. The sensing circuit can sense an electrical signal of the one-way data transmission line L1 or the separate line L2 used for the connection to the reception apparatus 200. For example, the sensing circuit can sense whether the connection between the receiver 211 and at least the reception terminal 212 and the transmission terminal 214 has been switched by measuring a voltage of the one-way data transmission line L1 or the separate line L2. Alternatively, the sensing circuit can sense whether the connection between the receiver 211 and at least the reception terminal 212 and the transmission terminal 214 has been switched by measuring levels of current flowing through the one-way data transmission line L1 and the separate line L2.

In another embodiment, unlike FIG. 2, the switchover sensing unit 150 can be included in another component. For example, the transmission unit 130 can include functions of the switchover sensing unit 150. In this example, the function of the switchover sensing unit 150 can be implemented by providing a function of recognizing a connection state of the connection to the reception apparatus 200 in the transmitter 133. For example, the switchover sensing unit 150 can be implemented by a connection sensing function of a network communication apparatus.

When the switchover sensing unit 150 senses that the connection to the reception apparatus 200 has been switched (i.e., the transmission apparatus 100 recognizes that there is an error in the data received by the reception apparatus 200), the encoding unit 120 can perform operations for re-transmitting the data in which the error has occurred at the reception apparatus 200 to the reception apparatus 200.

In an embodiment, when the switchover sensing unit 150 senses that the connection to the reception apparatus 200 has been switched, the switchover sensing unit 150 can directly control the encoding unit 130 so that the data is re-transmitted. In another embodiment, when the switchover sensing unit 150 senses that the connection to the reception apparatus 200 has been switched, the switchover sensing unit 150 can output a control signal. The separately provided controller or processor (not shown) can control the encoding unit 130 in response to the control signal.

The data can be provided to the reception data buffer 240 from the error detection unit 220. In embodiments of the present invention, when the error detection unit 220 determines that there is no error in the decrypted and decoded data, the error detection unit 220 can provide the decrypted and decoded data to the reception data buffer 240. The reception data buffer 240 acquires the provided data and can transfer the acquired data to the reception data collection system 1600 of FIG. 1 via the one-way reception proxy 1500.

The reception data buffer 240 can temporarily store (i.e., buffer) the provided data. In some embodiments, the timing at which the data is output from the transmission apparatus 100 and the timing at which that data is provided to the reception data buffer 240 may not be exactly the same. The reception data buffer 240 can buffer the data to synchronize the timing at which the data is output from the transmission apparatus 100 and the timing at which the data is provided to the reception data buffer 240. A time in which the reception data buffer 240 buffers the data can be adjusted to be suitable for the synchronization.

For example, the reception data buffer 240 can temporarily store the data in a database form. Alternatively, the reception data buffer 240 can temporarily store the data in the form of a file or a simple binary bit string. The implementation form of the reception data buffer 240 can be variously changed or modified as necessary.

To help understanding of the present invention, an example according to the embodiment of FIG. 2 will be described. In the embodiment of FIG. 2, the switchover control unit 230 can control switching of the connection between the reception terminal 212 and the receiver 211. Further, the switchover sensing unit 150 can sense whether the connection to the reception apparatus 200 via the transmission terminal 132 (i.e., the connection between the reception terminal 212 and the receiver 211) has been switched.

The transmission data buffer 110 can buffer preceding data which will be first transmitted to the reception apparatus 200. The encoding unit 120 can encode and encrypt the preceding data together with an integrity value for the preceding data.

The transmitter 131 can transmit the encoded and encrypted preceding data to the reception apparatus 200 via the transmission terminal 132.

After or during the transmission, the transmission data buffer 110 can further buffer following data which will be transmitted to the reception apparatus 200 subsequent to the preceding data. Further, the switchover sensing unit 150 can sense whether the connection to the reception apparatus 200 via the transmission terminal 132 (i.e., the connection between the reception terminal 212 and the receiver 211) has been switched.

The receiver 211 can receive the encoded and encrypted preceding data from the transmission apparatus 100 via the reception terminal 212. The error detection unit 220 can decrypt and decode the encoded and encrypted preceding data and examine whether there is an error in the decrypted and decoded preceding data.

When an error has occurred in the decrypted and decoded preceding data, the connection between the reception terminal 212 and the receiver 211 can be switched under control of the switchover control unit 230. Therefore, the switchover sensing unit 150 can sense that the connection to the reception apparatus 200 via the transmission terminal 132 has been switched. In this case, the encoding unit 120 can generate combined data by combining the preceding data and the following data. The encoding unit 120 can encode and encrypt the combined data together with an integrity value for the combined data. The transmission unit 130 can transmit the encoded and encrypted combined data to the reception apparatus 200 via the transmission terminal 132 using the transmitter 131. In this way, the preceding data (i.e., the data in which the error has occurred) included in the combined data can be re-transmitted to the reception apparatus 200.

After the switchover sensing unit 150 recognizes switching of the connection to the reception apparatus 200, the connection between the reception terminal 212 and the receiver 211 can be restored under control of the switchover control unit 230. After the connection between the reception terminal 212 and the receiver 211 is restored, the reception unit 210 can receive the encoded and encrypted combined data. In other words, the reception unit 210 can re-receive the preceding data (i.e., the data in which the error has occurred) included in the combined data by receiving the encoded and encrypted combined data via the reception terminal 212 with the receiver 211.

In some embodiments, the following data can be separate from the preceding data. In other words, in these embodiments, the transmission apparatus 100 can re-transmit the preceding data by including the preceding data in other data (e.g., the combined data). In some other embodiments, the following data can be identical to the preceding data. In other words, in these embodiments, the preceding data may not be included in other data, and the transmission apparatus 100 may re-transmit only the preceding data.

According to embodiments of the present invention, in one-way data communication, the occurrence of a data error can be easily recognized using switching in the reception apparatus 200. Further, data in which an error has occurred is re-transmitted, and thus the reliability of one-way data communication can be improved. In particular, according to embodiments of the present invention, the reception apparatus 200 does not transmit data to the transmission apparatus 100, and thus characteristics of the one-way data communication do not deteriorate.

On the other hand, when the error detection unit 220 determines that there is no error in the decrypted and decoded preceding data, the reception data buffer 240 can acquire the decrypted and decoded preceding data. In this case, it is unnecessary to re-transmit the preceding data. Therefore, the encoding unit 120 can encode and encrypt the following data together with an integrity value for the following data. The transmission unit 130 can transmit the encoded and encrypted following data to the reception apparatus 200 via the transmission terminal 132 using the transmitter 131. The receiver 211 can receive the encoded and encrypted following data from the transmission apparatus 100 via the reception terminal 212.

Figure 3:
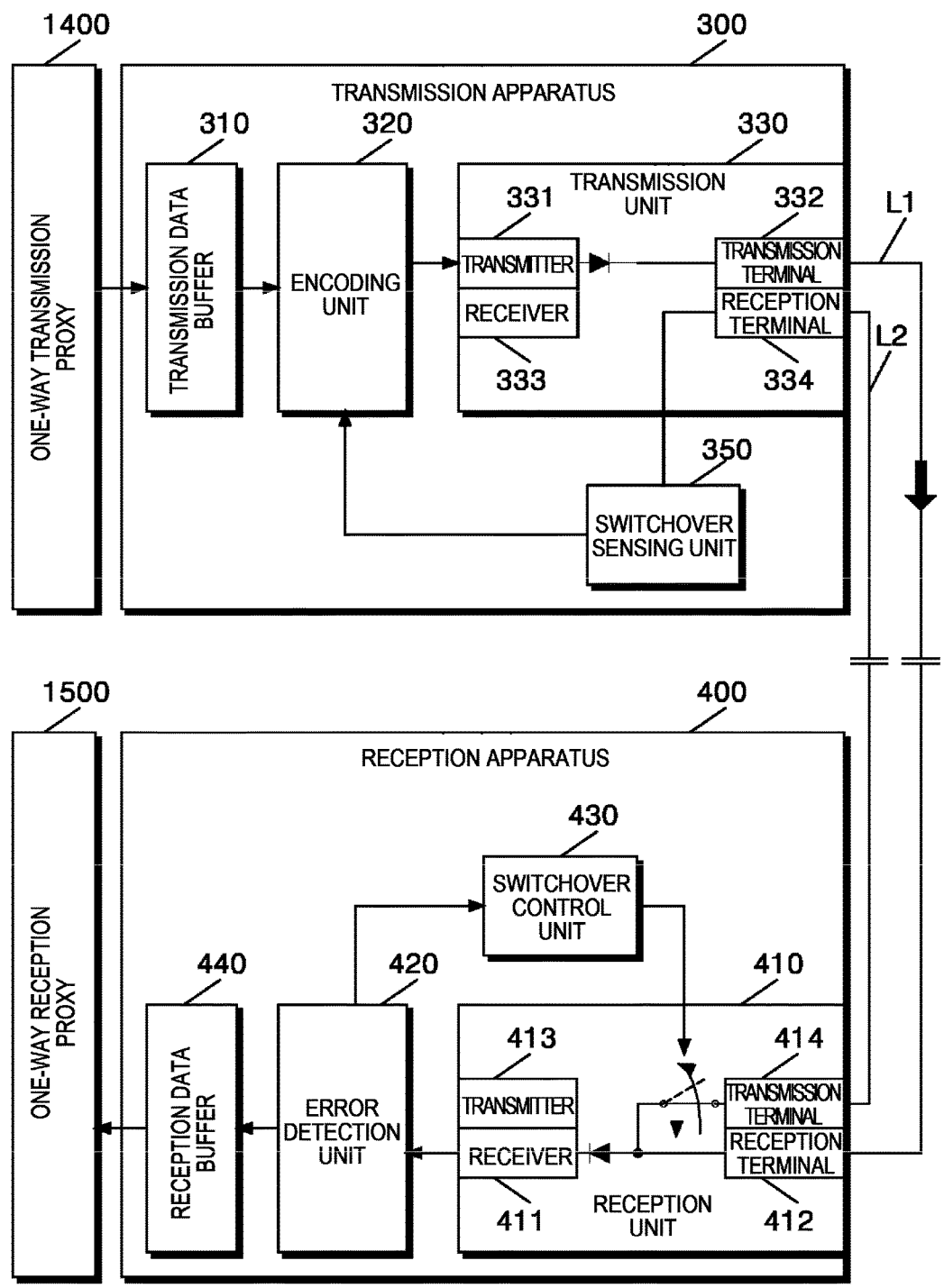
FIG. 3 is a block diagram showing another embodiment of configurations of the transmission apparatus and the reception apparatus of FIG. 1.

FIG. 3 is a block diagram showing another embodiment of configurations of the transmission apparatus and the reception apparatus of FIG. 1. The transmission apparatus 1100 of FIG. 1 can include a transmission apparatus 300 of FIG. 3. The reception apparatus 1200 of FIG. 1 can include a reception apparatus 400 of FIG. 3. FIG. 3 shows an embodiment in which the reception apparatus 400 switches the connection between the transmission apparatus 300 and the reception apparatus 400.

A transmission data buffer 310, an encoding unit 320, a transmitter 331, a transmission terminal 332, and the receiver 333 can be configured and operate in substantially the same way as or similarly to the transmission data buffer 110, the encoding unit 120, the transmitter 131, the transmission terminal 132, and the receiver 133 of FIG. 2. Therefore, for convenience of description, duplicate descriptions of the transmission data buffer 310, the encoding unit 320, the transmitter 331, the transmission terminal 332, and the receiver 333 will be omitted below.

A receiver 411, a reception terminal 412, a transmitter 413, an error detection unit 420, and a reception data buffer 440 can be configured and operate in substantially the same way as or similarly to the receiver 211, the reception terminal 212, the transmitter 213, the error detection unit 220, and the reception data buffer 240 of FIG. 2. Therefore, for convenience of description, duplicate descriptions of the receiver 411, the reception terminal 412, the transmitter 413, the error detection unit 420, and the reception data buffer 440 will be omitted below.

In the embodiment of FIG. 3, a reception terminal 334 of the transmission apparatus 300 can be connected to a transmission terminal 414 of the reception apparatus 400 via a separate line L2. However, a transmission path between the receiver 333 and the reception terminal 334 of the transmission apparatus 300 can be physically disconnected, and a transmission path between the transmitter 413 and the transmission terminal 414 of the reception apparatus 400 can be physically disconnected. Therefore, the separate line L2 is not used to transmit data.

In the embodiment of FIG. 3, a switchover control unit 430 can control switching of the connection between the transmission terminal 414 and the receiver 411. Further, a switchover sensing unit 350 can sense whether a connection to the reception apparatus 400 via the reception terminal 334 (i.e., the connection between the transmission terminal 414 and the receiver 411) has been switched. In other words, the separate line L2 can be used to recognize switching in the reception apparatus 400.

In the embodiment of FIG. 3, when the error detection unit 420 determines that there is an error in decrypted and decoded data, the reception apparatus 400 can re-receive data. More specifically, the connection between the transmission terminal 414 and the receiver 411 can be switched under control of the switchover control unit 430. Further, a reception unit 410 can re-receive the data via the reception terminal 412 using the receiver 411. The switched connection between the transmission terminal 414 and the receiver 411 can be restored after an appropriate time.

Although not shown in FIG. 3, in an embodiment, the switchover control unit 430 can be configured to control switching of connections between the receiver 411 and both the reception terminal 412 and the transmission terminal 414. Further, the switchover sensing unit 350 can be configured to sense whether connections to the reception apparatus 400 via both the transmission terminal 332 and the reception terminal 334 have been switched. In this embodiment, a one-way data transmission line L1 can be used to transmit data and recognize switching in the reception apparatus 400. On the other hand, the separate line L2 can be used only to recognize switching in the reception apparatus 400. Accordingly, characteristics of the one-way data communication may not deteriorate.

Figure 4:
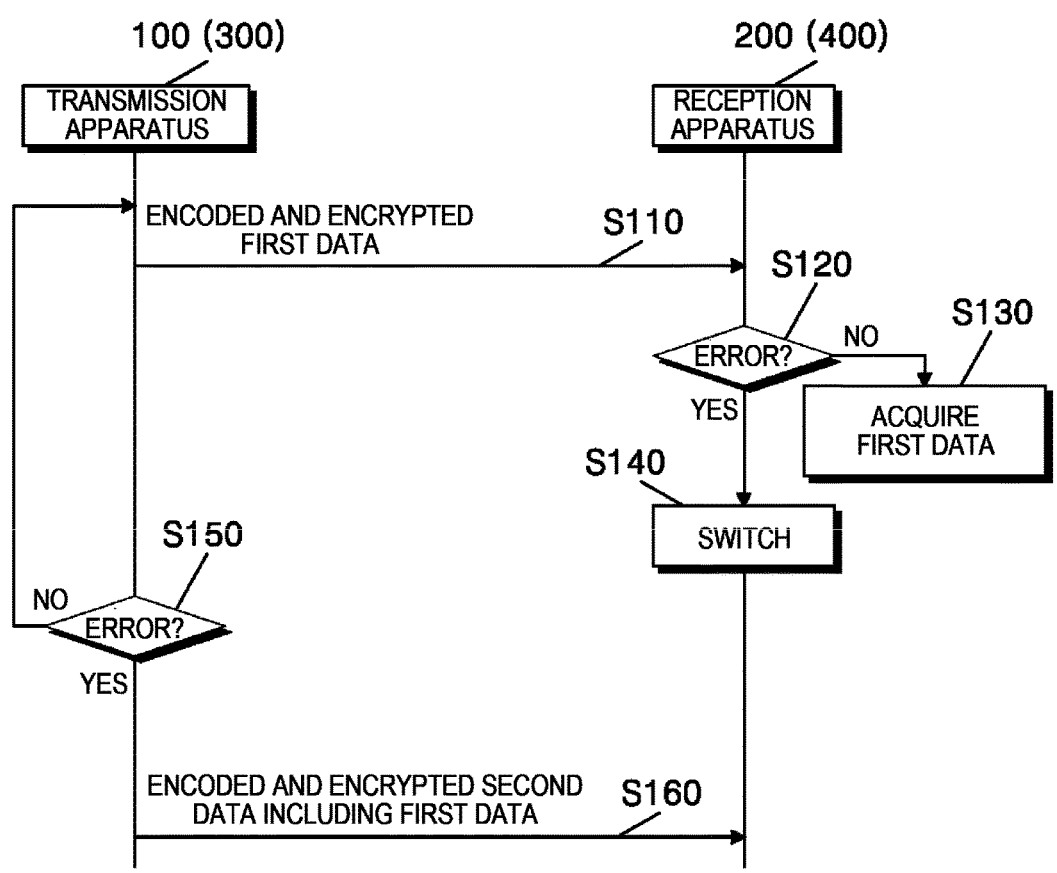
FIG. 4 is a flowchart illustrating operations of the transmission apparatus and the reception apparatus in the embodiment of FIG. 2 or 3.

FIG. 4 is a flowchart illustrating operations of the transmission apparatus and the reception apparatus in the embodiment of FIG. 2 or 3. FIG. 4 schematically shows operations in an embodiment in which the reception apparatus 200 or 400 switches the connection between the transmission apparatus 100 or 300 and the reception apparatus 200 or 400, respectively. For example, reception apparatus 200 switches between reception apparatus 200 and transmission apparatus 100 according to FIG. 2, and reception apparatus 400 switches between reception apparatus 400 and transmission apparatus 300 according to FIG. 4. Similar correlation will be applied throughout the specification. To help understanding of the present invention, description will be made with reference to FIGS. 2 and 3 as well.

In operation S110, the transmission apparatus 100 or 300 can transmit encoded and encrypted first data (e.g., encoded and encrypted preceding data) to the reception apparatus 200 or 400, respectively. The reception apparatus 200 or 400 can decrypt and decode the received data. In this way, the reception apparatus 200 or 400 can acquire a first integrity value used to detect an error in the first data.

In operation S120, for example, the reception apparatus 200 or 400 can examine whether there is an error in the decrypted and decoded first data with reference to the first integrity value. When there is no error, the reception apparatus 200 or 400 can acquire the decrypted and decoded first data in operation S130. On the other hand, when an error has occurred, the reception apparatus 200 or 400 can switch the connection between the reception terminal 212 and the receiver 211 or the connection between the transmission terminal 414 and the receiver 411, respectively, in operation S140.

In operation S150, the transmission apparatus 100 or 300 can sense whether the connection to the reception apparatus 200 or 400, respectively, (i.e., the connection between the reception terminal 212 and the receiver 211 or the connection between the transmission terminal 414 and the receiver 411) has been switched. When switching is not sensed, the transmission apparatus 100 or 300 can transmit following data (e.g., encoded and encrypted following data) to the reception apparatus 200 or 400, respectively.

On the other hand, when switching is sensed in operation S150, the transmission apparatus 100 or 300 can transmit encoded and encrypted second data (e.g., encoded and encrypted combined data) including the first data in which the error has occurred to the reception apparatus 200 or 400, respectively, in operation S160. In this way, the first data can be included in the second data and re-transmitted.

Figure 5:
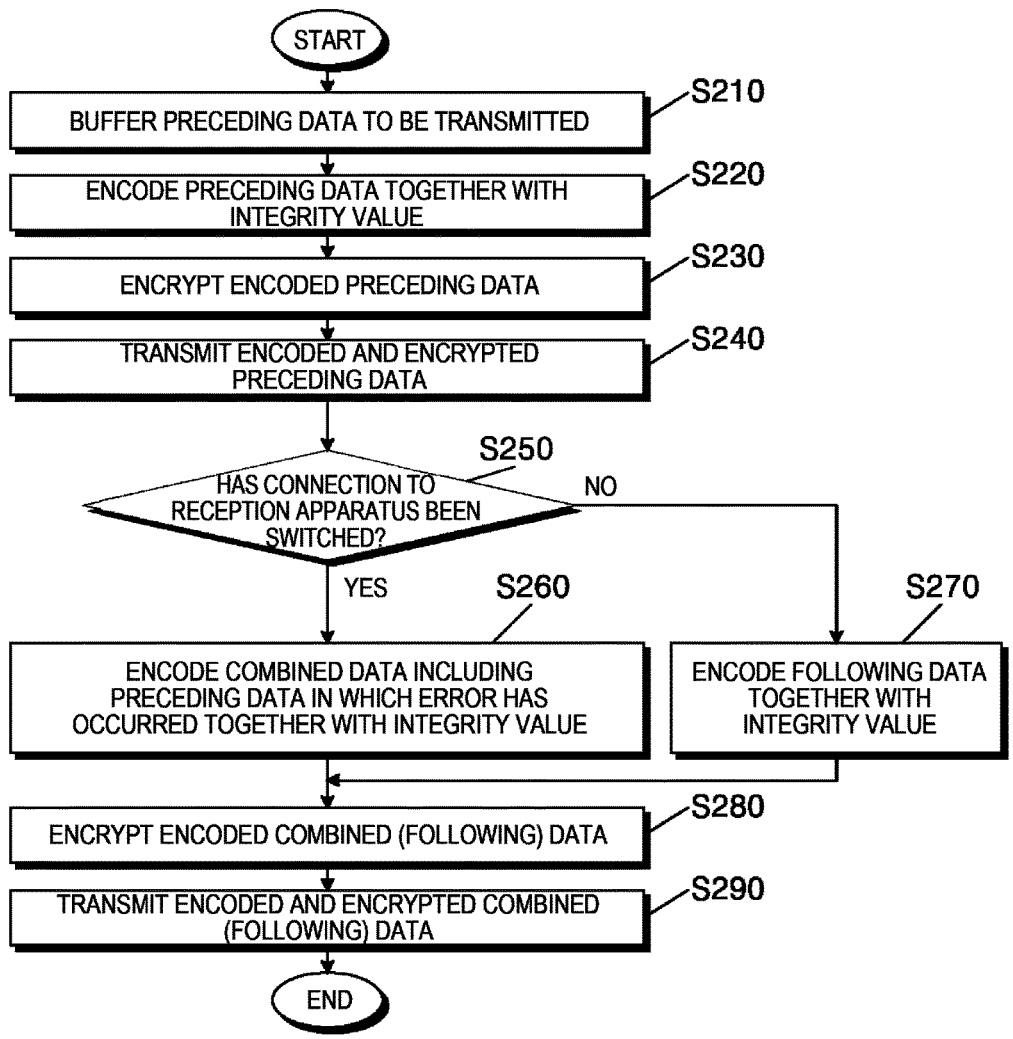
FIG. 5 is a flowchart illustrating a method of transmitting data using the transmission apparatus according to the embodiment of FIG. 2 or 3.

FIG. 5 is a flowchart illustrating a method of transmitting data using the transmission apparatus according to the embodiment of FIG. 2 or 3. For example, the method of FIG. 5 can be performed to transmit data in one direction to the reception apparatus 200 of FIG. 2 or the reception apparatus 400 of FIG. 3 using the transmission apparatus 100 of FIG. 2 or the transmission apparatus 300 of FIG. 3, respectively. To help understanding of the present invention, description will be made with reference to FIGS. 2 and 3 as well.

In operation S210, the transmission apparatus 100 or 300 can buffer first data (e.g., preceding data to be transmitted first) which will be transmitted to the reception apparatus 200 or 400, respectively. For example, the first data can be provided to the transmission apparatus 100 or 300 from at least one of the data transmission systems 1310, 1320, and 1330 (see FIG. 1) via the one-way transmission proxy 1400 using the transmission data buffer 110 or 310, respectively. The transmission data buffer 110 or 310 can buffer the provided first data.

In operation S220, the transmission apparatus 100 or 300 can encode the first data. For example, data buffered in the transmission data buffer 110 or 310 can be provided to the encoding unit 120 or 320 for encoding of the first data. In an embodiment, the encoding unit 120 or 320 can generate a first integrity value used by the reception apparatus 200 or 400 to detect an error in the first data, respectively. The encoding unit 120 or 320 can encode the first data together with the first integrity value.

In operation S230, the transmission apparatus 100 or 300 can encrypt the encoded first data. For example, the encoding unit 120 or 320 can encrypt the encoded first data using a first cipher key.

In operation S240, the transmission apparatus 100 or 300 can transmit the encoded and encrypted first data to the reception apparatus 200 or 400, respectively. For example, the transmitter 131 or 331 can transmit the encoded and encrypted first data to the reception apparatus 200 or 400 via the transmission terminal 132 or 332, respectively. The encoded and encrypted first data can be transmitted along the one-way data transmission line L1. After or during the transmission, the transmission apparatus 100 or 300 can further acquire third data (e.g., following data which will be transmitted subsequent to the preceding data) which will be transmitted to the reception apparatus 200 or 400, respectively.

In operation S250, the transmission apparatus 100 or 300 can sense whether a connection to the reception apparatus 200 or 400 via at least one of the transmission terminal 132 or 332 and the reception terminal 134 or 334 has been switched, respectively. For example, the switchover sensing unit 150 of the transmission apparatus 100 can sense whether the connection to the reception apparatus 200 via the transmission terminal 132 has been switched. For example, the switchover sensing unit 350 of the transmission apparatus 300 can sense whether the connection to the reception apparatus 400 via the reception terminal 334 has been switched.

As described above, the reception apparatus 200 or 400 cannot transmit data to the transmission apparatus 100 or 300, respectively. Therefore, in embodiments of the present invention, a switching operation can be performed in the reception apparatus 200 or 400 to notify the transmission apparatus 100 or 300 of an error in the received first data, respectively. The transmission apparatus 100 or 300 can recognize that an error has occurred in the transmitted first data by sensing switching of the connection to the reception apparatus 200 or 400, respectively.

When it is sensed that the connection to the reception apparatus 200 or 400 has been switched, operation S260 can be performed. On the other hand, when it is sensed that the connection to the reception apparatus 200 or 400 has not been switched, operation S270 can be performed.

In operation S260, the transmission apparatus 100 or 300 can encode second data (e.g., combined data including the preceding data and following data) including the first data (e.g., the preceding data). For example, data (particularly, the first data in which the error has occurred) stored in the transmission data buffer 110 or 310 can be provided to the encoding unit 120 or 320 for encoding of the second data, respectively. In an embodiment, the encoding unit 120 or 320 can generate a second integrity value used by the reception apparatus 200 or 400 to detect an error in the second data, respectively. The encoding unit 120 or 320 can encode the second data together with the second integrity value.

Further, in operation S280, the transmission apparatus 100 or 300 can encrypt the encoded second data using the encoding unit 120 or 320 and a second cipher key, respectively. Also, in operation S290, the transmission apparatus 100 or 300 can transmit the encoded and encrypted second data to the reception apparatus 200 or 400 via the transmission terminal 132 or 332 using the transmitter 131 or 331, respectively.

In operations S260, S280, and S290, the transmission apparatus 100 or 300 can include the first data in which the error has occurred in the second data, encode and encrypt the second data, and transmit the encoded and encrypted second data to the reception apparatus 200 or 400, respectively. In this way, when an error occurs in the first data received by the reception apparatus 200 or 400, the transmission apparatus 100 or 300 can re-transmit the first data to the reception apparatus 200 or 400, respectively. Therefore, data loss can be prevented, and reliability of the one-way data communication can be improved. Also, since data is encrypted and transmitted, a security tunnel can be established between the transmission apparatus 100 or 300 and the reception apparatus 200 or 400, respectively, and security of the one-way data communication can be improved.

In operation S270, the transmission apparatus 100 or 300 can encode the third data (e.g., the following data). When no error has occurred in the first data received by the reception apparatus 200 or 400, it is unnecessary to re-transmit the first data. Therefore, the transmission apparatus 100 or 300 can encode only the third data without the first data. In an embodiment, the encoding unit 120 or 320 can generate a third integrity value used by the reception apparatus 200 or 400 to detect an error in the third data, respectively. The encoding unit 120 or 320 can encode the third data together with the third integrity value.

Further, in operation S280, the transmission apparatus 100 or 300 can encrypt the encoded third data using the encoding unit 120 or 320 and a third cipher key, respectively. Also, in operation S290, the transmission apparatus 100 or 300 can transmit the encoded and encrypted third data to the reception apparatus 200 or 400 via the transmission terminal 132 or 332 using the transmitter 131 or 331, respectively.

In an embodiment, the first cipher key, the second cipher key, and the third cipher key can be symmetric keys. Information on the first cipher key, the second cipher key, and the third cipher key can be previously stored in each of the transmission apparatus 100 or 300 and the reception apparatus 200 or 400, respectively, but the present invention is not limited to this embodiment.

In some embodiments, to improve security of the one-way data communication, an update operation for at least one of the first cipher key, the second cipher key, and the third cipher key can be supported. In an embodiment, when an update condition for updating at least one of the first cipher key, the second cipher key, and the third cipher key is satisfied, the transmission apparatus 100 or 300 can transmit an update key to the reception apparatus 200 or 400 via the transmission terminal 132 or 332 using the transmitter 131 or 331, respectively. On the basis of the update key, at least one of the first cipher key, the second cipher key, and the third cipher key previously stored in each of the transmission apparatus 100 or 300 and the reception apparatus 200 or 400 can be updated, respectively.

For example, the update condition can be satisfied in a case in which an update request is provided from an administrator or a user, a case in which a certain time elapses after a cipher key has been set, a case in which a non-permitted communication request is generated, and other cases. However, these examples are for helping understanding of the present invention and do not limit the present invention. The update condition can be variously changed or modified as necessary.

Figure 6:
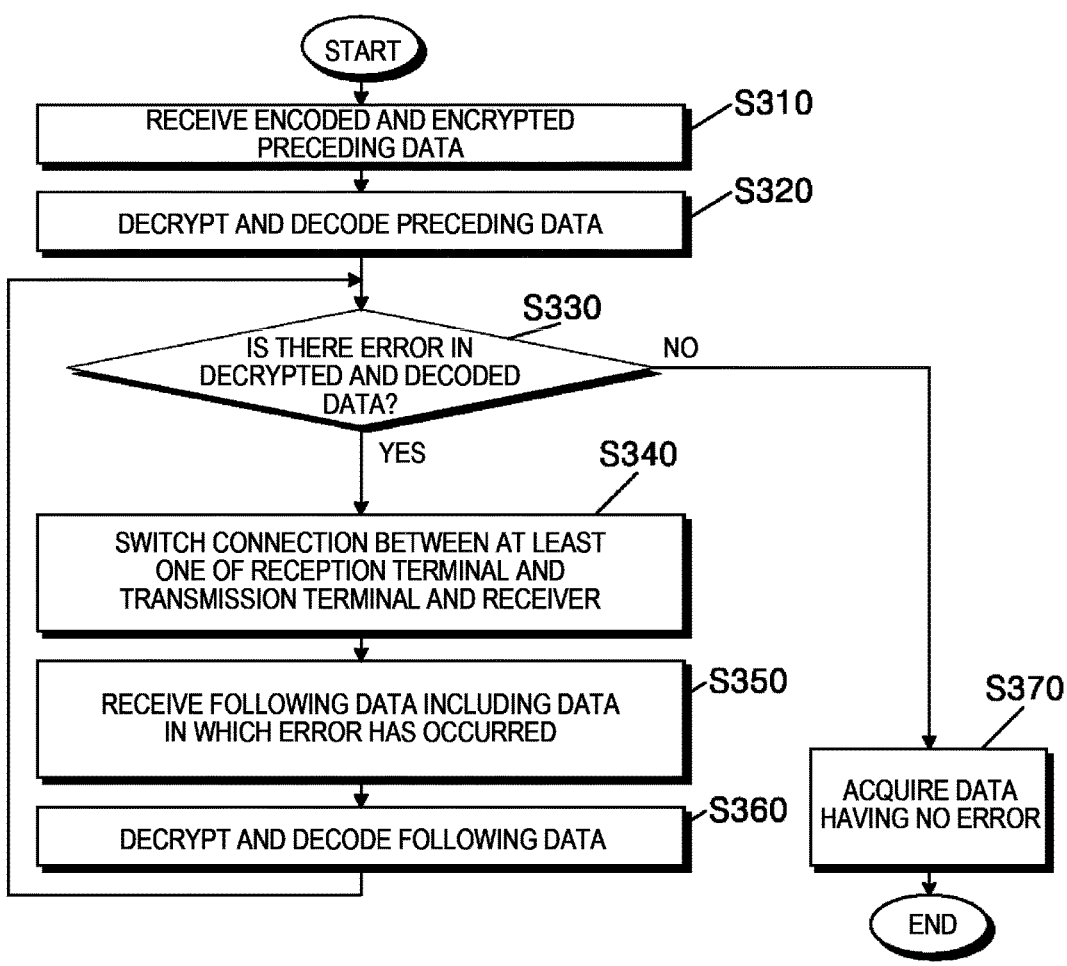
FIG. 6 is a flowchart illustrating a method of receiving data using the reception apparatus according to the embodiment of FIG. 2 or 3.

FIG. 6 is a flowchart illustrating a method of receiving data using the reception apparatus according to the embodiment of FIG. 2 or 3. For example, the method of FIG. 6 can be performed to receive data in one direction from the transmission apparatus 100 of FIG. 2 or the transmission apparatus 300 of FIG. 3 using the reception apparatus 200 of FIG. 2 or the reception apparatus 400 of FIG. 3. To help understanding of the present invention, description will be made with reference to FIGS. 2 and 3 as well.

In operation S310, the reception apparatus 200 or 400 can receive encoded and encrypted first data (e.g., preceding data) from the transmission apparatus 100 or 300, respectively. In an embodiment, the encoded and encrypted first data can include first data and an integrity value used to detect an error in the first data. The encoded and encrypted first data can be transmitted along the one-way data transmission line L1. The reception apparatus 200 or 400 can receive the encoded and encrypted first data via the reception terminal 212 or 412 using the receiver 211 or 411, respectively.

In operation S320, the reception apparatus 200 or 400 can decrypt and decode the encoded and encrypted first data. For example, the error detection unit 220 or 420 can decrypt and decode the encoded and encrypted first data using a cipher key. In this way, the reception apparatus 200 or 400 can acquire the first data included in the encoded and encrypted first data and the integrity value corresponding to the first data.

In operation S330, the reception apparatus 200 or 400 can examine whether there is an error in the decrypted and decoded first data. More specifically, the error detection unit 220 or 420 can examine whether there is an error in the first data with reference to the integrity value. When it is determined that there is an error in the first data, operation S340 can be performed. On the other hand, when it is determined that there is no error in the first data, operation S370 can be performed.

In operation S340, the reception apparatus 200 or 400 can switch the connection between the receiver 211 or 411, and at least one of the reception terminal 212 or 412 and the transmission terminal 214 or 414, respectively. For example, the switchover control unit 230 of the reception apparatus 200 can switch the connection between the reception terminal 212 and the receiver 211. For example, the switchover control unit 430 of the reception apparatus 400 can switch the connection between the transmission terminal 414 and the receiver 411.

As described above, the reception apparatus 200 or 400 cannot transmit data to the transmission apparatus 100 or 300, respectively. Therefore, in embodiments of the present invention, a switching operation can be performed in the reception apparatus 200 or 400 to notify the transmission apparatus 100 or 300 of an error in the first data, respectively. According to embodiments of the present invention, in one-way data communication, the occurrence of a data error can be easily indicated by the switching operation.

In operation S350, the reception apparatus 200 or 400 can receive second data (e.g., encoded and encrypted combined data including the preceding data and following data) including the first data in which the error has occurred from the transmission apparatus 100 or 300. Further, in operation S360, the reception apparatus 200 or 400 can acquire second data included in the encoded and encrypted second data and an integrity value corresponding to the second data by decrypting and decoding the encoded and encrypted second data. In operation S330 again, the error detection unit 220 or 420 can examine whether there is an error in the second data with reference to the integrity value.

In operations S340 to S360, the reception apparatus 200 or 400 can notify the transmission apparatus 100 or 300 of the data error and re-receive the data in which the error has occurred, respectively. Therefore, data loss can be prevented, and reliability of the one-way data communication can be improved. Also, since data is encrypted and transmitted, a security tunnel can be established between the transmission apparatus 100 or 300 and the reception apparatus 200 or 400, respectively, and security of the one-way data communication can be improved.

In operation S370, the reception apparatus 200 or 400 can acquire the data having no error. For example, the reception data buffer 240 or 440 can acquire the decrypted and decoded data that has been determined to have no error. The reception data buffer 240 or 440 can transfer the acquired data to at least one of the data collection systems 1610, 1620, and 1630 (see FIG. 1) via the one-way reception proxy 1500.

In some embodiments, to improve security of the one-way data communication, an update operation for the cipher key can be supported. In an embodiment, when an update condition for updating the cipher key is satisfied, an update key can be provided to the reception apparatus 200 or 400 via the reception terminal 212 or 412 using the receiver 211 or 411, respectively. On the basis of the update key, the cipher key used by the reception apparatus 200 or 400 can be updated.

Figure 7:
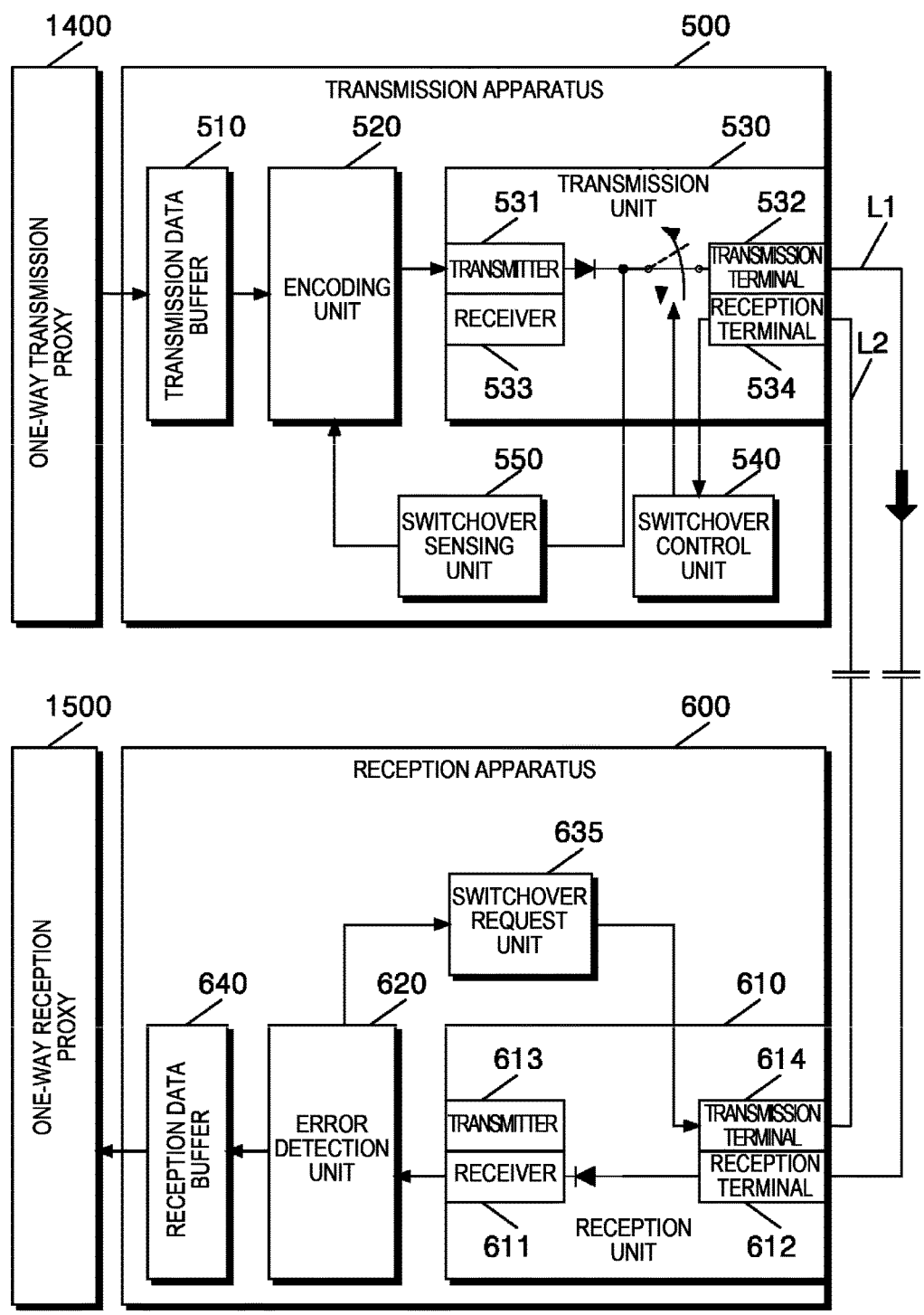
FIG. 7 is a block diagram showing still another embodiment of configurations of the transmission apparatus and the reception apparatus of FIG. 1.

FIG. 7 is a block diagram showing still another embodiment of configurations of the transmission apparatus and the reception apparatus of FIG. 1. The transmission apparatus 1100 of FIG. 1 can include a transmission apparatus 500 of FIG. 7. The reception apparatus 1200 of FIG. 1 can include a reception apparatus 600 of FIG. 7. FIG. 7 shows an embodiment in which the transmission apparatus 500 switches the connection between the transmission apparatus 500 and the reception apparatus 600.

The transmission apparatus 500 can include a transmission data buffer 510, an encoding unit 520, a transmission unit 530, a switchover control unit 540, and a switchover sensing unit 550. The transmission apparatus 500 can acquire data from at least one of the data transmission systems 1310, 1320, and 1330 of FIG. 1 via the one-way transmission proxy 1400.

The data can be provided to the transmission data buffer 510 from the one-way transmission proxy 1400. The transmission data buffer 510 can buffer data to be transmitted to the reception apparatus 600. The transmission data buffer 510 can provide the buffered data to the encoding unit 520. The transmission data buffer 510 can be configured and operate in substantially the same way as or similarly to the transmission data buffer 110 of FIG. 2. Therefore, for convenience of description, duplicate descriptions of the transmission data buffer 510 will be omitted below.

The data can be provided to the encoding unit 520 from the transmission data buffer 510. The encoding unit 520 can encode the provided data using an encoding technique. In an embodiment, the encoding unit 520 can generate an integrity value used by the reception apparatus 600 to detect an error in the data. In this embodiment, the encoding unit 520 can encode the provided data together with the integrity value.

Further, in embodiments of the present invention, the encoding unit 520 can encrypt the encoded data. For example, the encoding unit 520 can encrypt the encoded data using a cipher key. The encoding unit 520 can provide the encoded and encrypted data to the transmission unit 530. The encoding unit 520 can be configured and operate in substantially the same way as or similarly to the encoding unit 120 of FIG. 2. Therefore, for convenience of description, duplicate descriptions of the encoding unit 520 will be omitted below.

The transmission unit 530 can include a transmitter 531 and a transmission terminal 532. The encoded and encrypted data can be provided to the transmitter 531 from the encoding unit 520. The transmission terminal 532 can be connected to a reception terminal 612 of the reception apparatus 600 via a one-way data transmission line L1. The transmitter 531 can transmit the encoded and encrypted data to the reception apparatus 600 via the transmission terminal 532.

The transmission unit 530 can further include a receiver 533 and a reception terminal 534. In the embodiment of FIG. 7, the reception terminal 534 can be connected to a transmission terminal 614 of the reception apparatus 600 via a separate line L2. For example, in some embodiments (e.g., a case in which the transmission apparatus 500 and the reception apparatus 600 operate in an environment employing a two-way data communication protocol, such as TCP/IP), the reception terminal 534 and the transmission terminal 614 of the reception apparatus 600 can be connected via the separate line L2.

However, a transmission path between the receiver 533 and the reception terminal 534 of the transmission apparatus 500 can be physically disconnected. Therefore, the transmission apparatus 500 may not receive data from the reception apparatus 600. In other words, while the separate line L2 is not used to transmit data, one-way data communication can be performed between the transmission apparatus 500 and the reception apparatus 600. In a certain embodiment, the transmission unit 530 may not include the receiver 533. Alternatively, the function of the receiver 533 may not be carried out.

In the embodiment of FIG. 7, a switching request signal can be provided to the transmission unit 530 from the reception apparatus 600 via the reception terminal 534. The switching request signal can be provided to the switchover control unit 540. When an error occurs in the data received by the reception apparatus 600, the switching request signal can be provided from the reception apparatus 600, which will be further described below.

The switching request signal can be provided to the switchover control unit 540 via the reception terminal 534. The switchover control unit 540 can control switching of the connection between at least one of the transmitter 531 and the receiver 533 and the transmission terminal 532 in response to the switching request signal. In other words, in the embodiment of FIG. 7, a switching operation can be performed in the transmission apparatus 500, unlike the embodiments of FIGS. 2 and 3. The transmission apparatus 500 can recognize an error in the data received by the reception apparatus 600 through switching therein. The switchover control unit 540 can be configured and operate in substantially the same way as or similarly to the switchover control unit 230 of FIG. 2. Therefore, for convenience of description, duplicate descriptions of the switchover control unit 540 will be omitted below.

The switchover sensing unit 550 can sense whether the connection between the transmission terminal 532, and at least one of the transmitter 531 and the receiver 533 has been switched. A configuration and operations of the switchover sensing unit 550 will be further described below.

The reception apparatus 600 can include a reception unit 610, an error detection unit 620, a switchover request unit 635, and a reception data buffer 640. The reception apparatus 600 can receive the data from the transmission apparatus 500 via the one-way data transmission line L1. The reception apparatus 600 can transfer the data to at least one of the data collection systems 1610, 1620, and 1630 of FIG. 1 via the one-way reception proxy 1500.

The reception unit 610 can include a receiver 611 and the reception terminal 612. The reception terminal 612 can be connected to the transmission terminal 532 of the transmission apparatus 500 via the one-way data transmission line L1. The receiver 611 can receive the encoded and encrypted data from the transmission apparatus 500 via the reception terminal 612.

The reception unit 610 can further include a transmitter 613 and the transmission terminal 614. In the embodiment of FIG. 7, the transmission terminal 614 can be connected to the reception terminal 534 of the transmission apparatus 500 via the separate line L2. For example, in some embodiments (e.g., a case in which the transmission apparatus 500 and the reception apparatus 600 operate in an environment employing a two-way data communication protocol, such as TCP/IP), the transmission terminal 614 and the reception terminal 534 of the transmission apparatus 500 can be connected via the separate line L2.

However, a transmission path between the transmitter 531 and the transmission terminal 532 of the transmission apparatus 500 can be physically disconnected. Therefore, the reception apparatus 600 may not transmit data to the transmission apparatus 500. In other words, while the separate line L2 is not used to transmit data, one-way data communication can be performed between the transmission apparatus 500 and the reception apparatus 600. In a certain embodiment, the reception unit 610 may not include the transmitter 613. Alternatively, the function of the transmitter 613 may not be carried out.

The encoded and encrypted data can be provided to the error detection unit 620 from the receiver 611 of the reception unit 610. For example, the error detection unit 620 can decrypt the encoded and encrypted data using the cipher key. Further, the error detection unit 620 can decode the decrypted data using a decoding technique corresponding to the encoding technique used by the encoding unit 520. The error detection unit 620 can examine whether there is an error in the decrypted and decoded data.

In an embodiment, as mentioned above, the data received by the reception apparatus 600 can include the integrity value generated by the transmission apparatus 500, more specifically, the encoding unit 520. In this embodiment, the error detection unit 620 can examine whether there is an error in the decrypted and decoded data with reference to the integrity value. The error detection unit 620 can be configured and operate in substantially the same way as or similarly to the error detection unit 220 of FIG. 2. Therefore, for convenience of description, duplicate descriptions of the error detection unit 620 will be omitted below.

The switchover request unit 635 can transmit the switching request signal to the transmission apparatus 500 via the transmission terminal 614. More specifically, when the error detection unit 620 determines that there is an error in the decrypted and decoded data, the switchover request unit 635 can transmit the switching request signal to the transmission apparatus 500. In this way, the reception apparatus 600 can notify the transmission apparatus 500 of the data error.

In response to the switching request signal transmitted from the switchover request unit 635 of the reception apparatus 600, the switchover control unit 540 can control the connection between the transmission terminal 532, and at least one of the transmitter 531 and the receiver 533. The switchover sensing unit 550 can sense switching of the connection between the transmission terminal 532, and the at least one of the transmitter 531 and the receiver 533. In this way, the transmission apparatus 500 can recognize that an error has occurred in the data received by the reception apparatus 600.

When the switchover sensing unit 550 senses switching, the data in which the error has occurred can be re-transmitted to the reception apparatus 600. To this end, the encoding unit 520 can perform operations for re-transmitting the data in which the error has occurred at the reception apparatus to the reception apparatus 600. The switchover sensing unit 550 can be configured and operate in substantially the same way as or similarly to the switchover sensing unit 150 of FIG. 2. Therefore, for convenience of description, duplicate descriptions of the switchover sensing unit 550 will be omitted below.

The data can be provided to the reception data buffer 640 from the error detection unit 620. In embodiments of the present invention, when the error detection unit 620 determines that there is no error in the decrypted and decoded data, the error detection unit 620 can provide the decrypted and decoded data to the reception data buffer 640. The reception data buffer 640 can acquire the provided data and transfer the acquired data to the reception data collection system 1600 of FIG. 1 via the one-way reception proxy 1500. The reception data buffer 640 can be configured and operate in substantially the same way as or similarly to the reception data buffer 240 of FIG. 2. Therefore, for convenience of description, duplicate descriptions of the reception data buffer 640 will be omitted below.

To help understanding of the present invention, an example according to the embodiment of FIG. 7 will be described. In the embodiment of FIG. 7, the switchover control unit 530 can control switching of the connection between the transmitter 531 and the transmission terminal 532. Further, the switchover sensing unit 550 can sense whether the connection between the transmitter 531 and the transmission terminal 532 has been switched.

The transmission data buffer 510 can buffer preceding data which will be first transmitted to the reception apparatus 600. The encoding unit 520 can encode and encrypt the preceding data together with an integrity value for the preceding data. The transmitter 531 can transmit the encoded and encrypted preceding data to the reception apparatus 600 via the transmission terminal 532.

After or during the transmission, the transmission data buffer 510 can further buffer following data which will be transmitted to the reception apparatus 600 subsequent to the preceding data. Further, the switchover sensing unit 550 can sense whether the connection between the transmitter 531 and the transmission terminal 532 has been switched.

The receiver 611 can receive the encoded and encrypted preceding data from the transmission apparatus 500 via the reception terminal 612. The error detection unit 620 can decrypt and decode the encoded and encrypted preceding data and examine whether there is an error in the decrypted and decoded preceding data. When an error has occurred in the decrypted and decoded preceding data, the switchover request unit 635 can transmit a switching request signal to the transmission apparatus 500 via the transmission terminal 614.

When the switching request signal is provided, the connection between the transmitter 531 and the transmission terminal 532 can be switched under control of the switchover control unit 540. After the switchover sensing unit 550 senses switching of the connection between the transmitter 531 and the transmission terminal 532, the encoding unit 520 can generate combined data by combining the preceding data and the following data. The encoding unit 520 can encode and encrypt the combined data together with an integrity value for the combined data.

After the switchover sensing unit 550 recognizes switching of the connection between the transmitter 531 and the transmission terminal 532, the connection between the transmitter 531 and the transmission terminal 532 can be restored under control of the switchover control unit 540. After the connection between the transmitter 531 and the transmission terminal 532 is restored, the transmission unit 530 can transmit the encoded and encrypted combined data to the reception apparatus 600 via the transmission terminal 532 using the transmitter 531. In this way, the preceding data (i.e., the data in which the error has occurred) included in the combined data can be re-transmitted to the reception apparatus 600.

On the other hand, when the error detection unit 620 determines that there is no error in the decrypted and decoded preceding data, the reception data buffer 640 can acquire the decrypted and decoded preceding data. In this case, it is unnecessary to re-transmit the preceding data. Therefore, the encoding unit 520 can encode and encrypt the following data together with an integrity value for the following data. The transmission unit 530 can transmit the encoded and encrypted following data to the reception apparatus 600 via the transmission terminal 532 using the transmitter 531.

Figure 8:
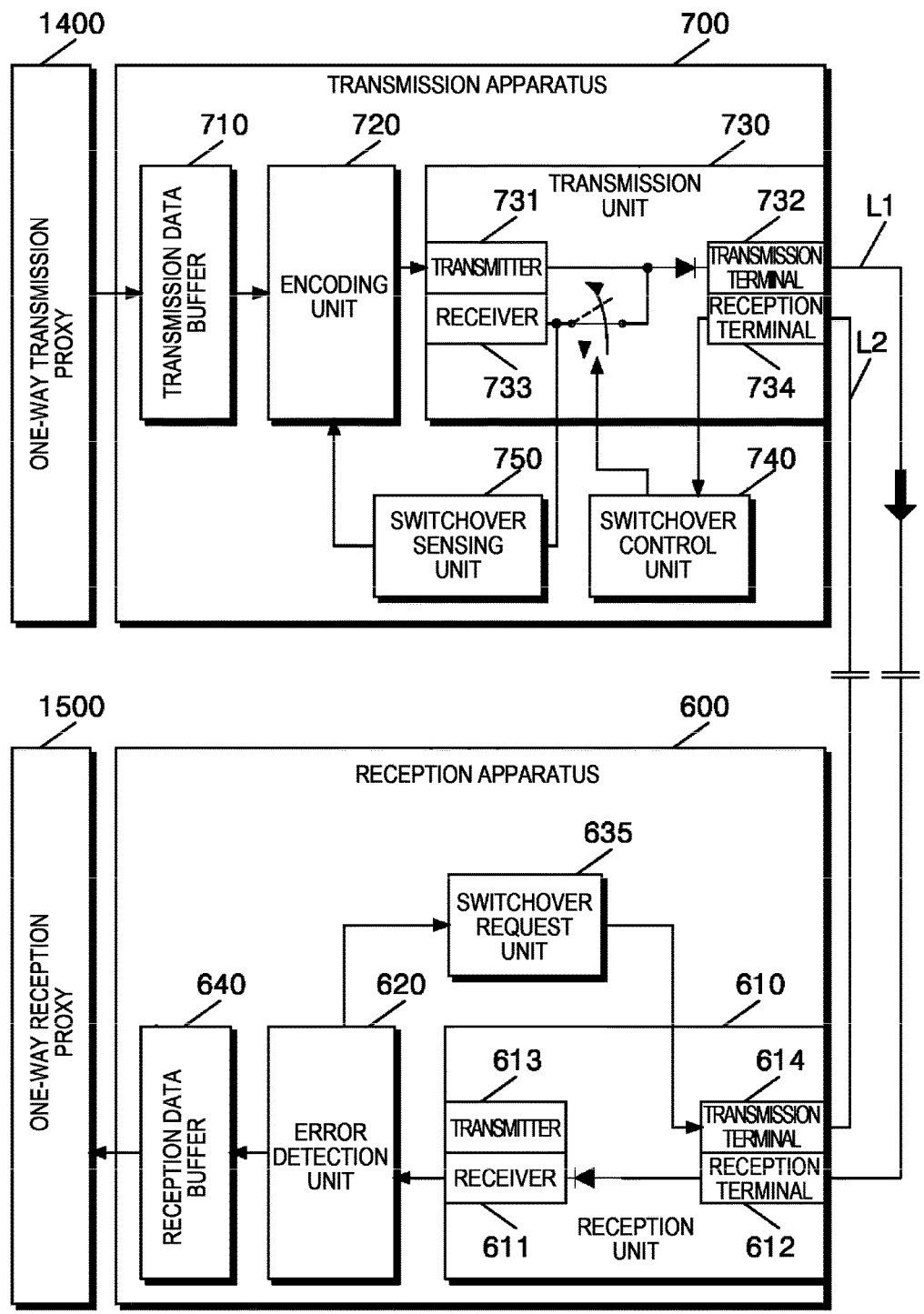
FIG. 8 is a block diagram showing yet another embodiment of configurations of the transmission apparatus and the reception apparatus of FIG. 1.

FIG. 8 is a block diagram showing yet another embodiment of configurations of the transmission apparatus and the reception apparatus of FIG. 1. The transmission apparatus 1100 of FIG. 1 can include a transmission apparatus 700 of FIG. 8. The reception apparatus 1200 of FIG. 1 can include a reception apparatus 600 of FIG. 8. FIG. 8 shows an embodiment in which the transmission apparatus 700 switches the connection between the transmission apparatus 700 and the reception apparatus 600.

A transmission data buffer 710, an encoding unit 720, a transmitter 731, a transmission terminal 732, and a reception terminal 734 can be configured and operate in substantially the same way as or similarly to the transmission data buffer 510, the encoding unit 520, the transmitter 531, the transmission terminal 532, and the reception terminal 534 of FIG. 7. Therefore, for convenience of description, duplicate descriptions of the transmission data buffer 710, the encoding unit 720, the transmitter 731, the transmission terminal 732, and the reception terminal 734 will be omitted below. Configurations and operations of a receiver 611, a reception terminal 612, a transmitter 613, a transmission terminal 614, an error detection unit 620, a switchover request unit 635, and a reception data buffer 640 have been described with reference to FIG. 7.

In the embodiment of FIG. 8, the switchover control unit 740 can control switching of the connection between a receiver 733 and the transmission terminal 732. Further, a switchover sensing unit 750 can sense whether the connection between the receiver 733 and the transmission terminal 732 has been switched. When the error detection unit 620 determines that there is an error in decrypted and decoded data, the switchover request unit 635 can transmit a switching request signal to the transmission apparatus 700 via the transmission terminal 614. In other words, a separate line L2 can be used to transmit the switching request signal.

When the switching request signal is provided, the connection between the receiver 733 and the transmission terminal 732 can be switched under control of the switchover control unit 740. After the switchover sensing unit 750 senses switching of the connection between the receiver 733 and the transmission terminal 732, the encoding unit 720 can generate combined data by combining preceding data and following data. The encoding unit 720 can encode and encrypt the combined data together with an integrity value for the combined data.

The transmission unit 730 can transmit the encoded and encrypted combined data to the reception apparatus 600 via the transmission terminal 732 using the transmitter 731. In this way, the preceding data (i.e., the data in which the error has occurred) included in the combined data can be re-transmitted to the reception apparatus 600. The switched connection between the receiver 733 and the transmission terminal 732 can be restored after an appropriate time.

Although not shown in FIG. 8, in an embodiment, the switchover control unit 740 can be configured to control switching of connections between the transmission terminal 732 and both the transmitter 731 and the receiver 733. Further, the switchover sensing unit 750 can be configured to sense whether the connections between the transmission terminal 732 and both the transmitter 731 and the receiver 733 have been switched.

Figure 9:
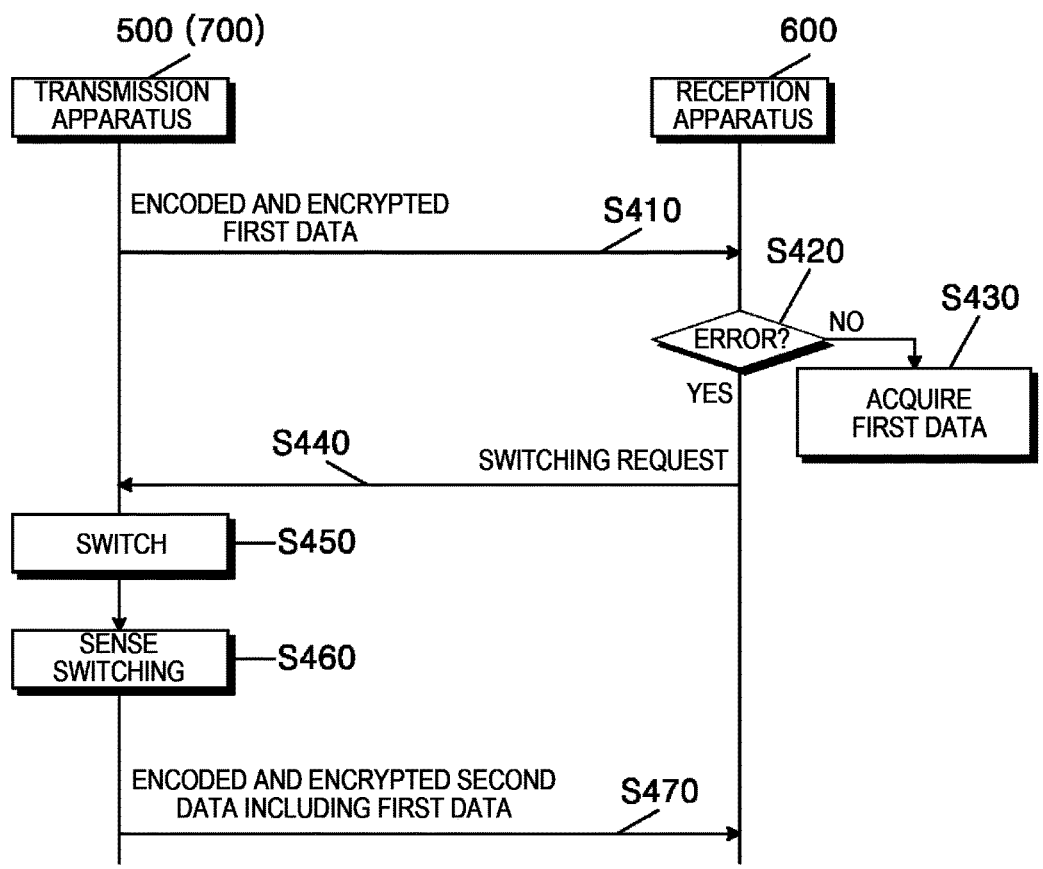
FIG. 9 is a flowchart illustrating operations of the transmission apparatus and the reception apparatus in the embodiment of FIG. 7 or 8.

FIG. 9 is a flowchart illustrating operations of the transmission apparatus and the reception apparatus in the embodiment of FIG. 7 or 8. FIG. 9 schematically shows operations in an embodiment in which the transmission apparatus 500 or 700 switches the connection between the transmission apparatus 500 or 700 and the reception apparatus 600. To help understanding of the present invention, description will be made with reference to FIGS. 7 and 8 as well.

In operation S410, the transmission apparatus 500 or 700 can transmit encoded and encrypted first data (e.g., encoded and encrypted preceding data) to the reception apparatus 600. The reception apparatus 600 can decrypt and decode the received data. In this way, the reception apparatus 600 can acquire a first integrity value used to detect an error in the first data.

In operation S420, for example, the reception apparatus 600 can examine whether there is an error in the decrypted and decoded first data with reference to the first integrity value. When there is no error, the reception apparatus 600 can acquire the decrypted and decoded first data in operation S430. On the other hand, when an error has occurred, the reception apparatus 600 can transmit a switching request signal to the transmission apparatus 500 or 700 in operation S440.

When the switching request signal is provided, the transmission apparatus 500 or 700 can switch the connection between the transmitter 531 and the transmission terminal 532 and/or the connection between the receiver 733 and the transmission terminal 732 in operation S450, respectively. Further, in operation S460, the transmission apparatus 500 or 700 can sense switching of the connection between the transmitter 531 and the transmission terminal 532 or the connection between the receiver 733 and the transmission terminal 732, respectively.

When switching is sensed, the transmission apparatus 500 or 700 can transmit encoded and encrypted second data (e.g., encoded and encrypted combined data) including the first data in which the error has occurred to the reception apparatus 600 in operation S470. In this way, the first data can be included in the second data and re-transmitted.

Figure 10:
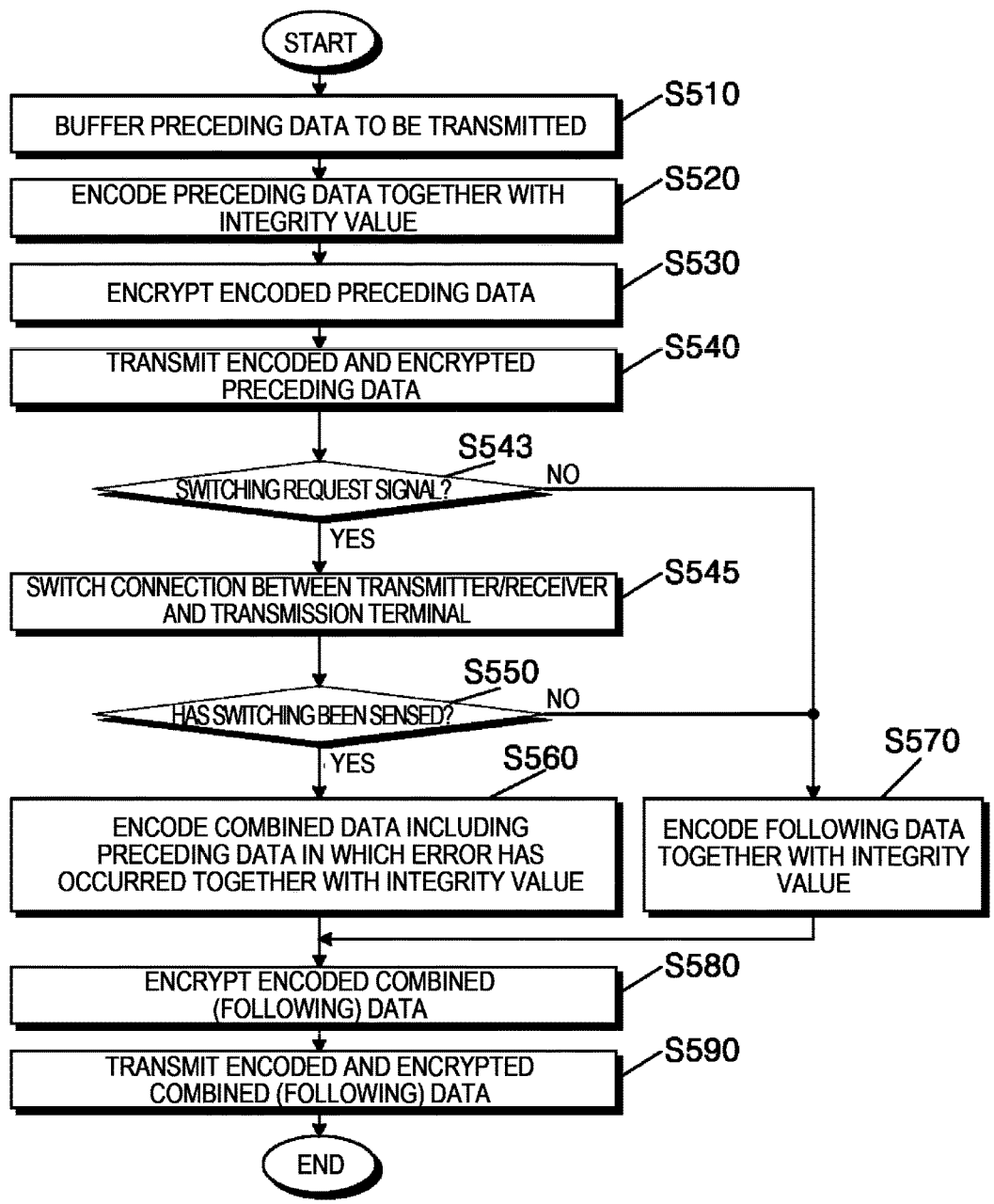
FIG. 10 is a flowchart illustrating a method of transmitting data using the transmission apparatus according to the embodiment of FIG. 7 or 8.

FIG. 10 is a flowchart illustrating a method of transmitting data using the transmission apparatus according to the embodiment of FIG. 7 or 8. For example, the method of FIG. 10 can be performed to transmit data in one direction to the reception apparatus 600 of FIG. 7 or 8 using the transmission apparatus 500 of FIG. 7 or the transmission apparatus 700 of FIG. 8. To help understanding of the present invention, description will be made with reference to FIGS. 7 and 8 as well.

In operation S510, the transmission apparatus 500 or 700 can buffer first data (e.g., preceding data to be transmitted first) which will be transmitted to the reception apparatus 600. For example, the first data can be provided to the transmission apparatus 500 or 700 from at least one of the data transmission systems 1310, 1320, and 1330 (see FIG. 1) via the one-way transmission proxy 1400 using the transmission data buffer 510 or 710, respectively. The transmission data buffer 510 or 710 can buffer the provided first data.

In operation S520, the transmission apparatus 500 or 700 can encode the first data. For example, data buffered in the transmission data buffer 510 or 710 can be provided to the encoding unit 520 or 720 for encoding of the first data, respectively. In an embodiment, the encoding unit 520 or 720 can generate a first integrity value used by the reception apparatus 600 to detect an error in the first data. The encoding unit 520 or 720 can encode the first data together with the first integrity value.

In operation S530, the transmission apparatus 500 or 700 can encrypt the encoded first data. For example, the encoding unit 520 or 720 can encrypt the encoded first data using a first cipher key.

In operation S540, the transmission apparatus 500 or 700 can transmit the encoded and encrypted first data to the reception apparatus 600. For example, the transmitter 531 or 731 can transmit the encoded and encrypted first data to the reception apparatus 600 via the transmission terminal 532 or 732, respectively. The encoded and encrypted first data can be transmitted along the one-way data transmission line L1. After or during the transmission, the transmission apparatus 500 or 700 can further acquire third data (e.g., following data which will be transmitted subsequent to the preceding data) which will be transmitted to the reception apparatus 600.

In operation S543, the transmission apparatus 500 or 700 can determine whether a switching request signal is provided from the reception apparatus 600. For example, the switchover control unit 540 or 740 can recognize the switching request signal provided via the reception terminal 534 or 734, respectively. When the switching request signal is not provided, operation S570 can be performed.

On the other hand, when the switching request signal is provided, the transmission apparatus 500 or 700 can switch the connection between the transmission terminal 532 or 732, at least one of the transmitter 531 or 731 and the receiver 533 or 733 in operation S545, respectively. For example, the switchover control unit 540 of the transmission apparatus 500 can switch the connection between the transmitter 531 and the transmission terminal 532. For example, the switchover control unit 740 of the transmission apparatus 700 can switch the connection between the receiver 733 and the transmission terminal 732.

In operation S550, the transmission apparatus 500 or 700 can sense whether the connection between the transmission terminal 532 or 732, and at least one of the transmitter 531 or 731 and the receiver 533 and 733 has been switched, respectively. For example, the switchover sensing unit 550 of the transmission apparatus 500 can sense whether the connection between the transmitter 531 and the transmission terminal 532 has been switched. For example, the switchover sensing unit 750 of the transmission apparatus 700 can sense whether the connection between the receiver 733 and the transmission terminal 732 has been switched.

As described above, the reception apparatus 600 cannot transmit data to the transmission apparatus 500 or 700. Therefore, in embodiments of the present invention, the reception apparatus 600 can transmit a switching request signal to notify the transmission apparatus 500 or 700 of an error in the received first data. A switching operation can be performed in the transmission apparatus 500 or 700 in response to the switching request signal and recognize that an error has occurred in the transmitted first data.

When the switching is sensed, operation S560 can be performed. On the other hand, when the switching is not sensed, operation S570 can be performed.

In operation S560, the transmission apparatus 500 or 700 can encode second data (e.g., combined data including the preceding data and the following data) including the first data (e.g., the preceding data). For example, data (particularly, the first data in which the error has occurred) stored in the transmission data buffer 510 or 710 can be provided to the encoding unit 520 or 720 for encoding of the second data, respectively. In an embodiment, the encoding unit 520 or 720 can generate a second integrity value used by the reception apparatus 600 to detect an error in the second data. The encoding unit 520 or 720 can encode the second data together with the second integrity value.

Further, in operation S580, the transmission apparatus 500 or 700 can encrypt the encoded second data using the encoding unit 520 or 720 and a second cipher key, respectively. Also, in operation S590, the transmission apparatus 500 or 700 can transmit the encoded and encrypted second data to the reception apparatus 600 via the transmission terminal 532 or 732 using the transmitter 531 or 731, respectively.

In operations S543 to S590, the transmission apparatus 500 or 700 can include the first data in which the error has occurred in the second data, encode and encrypt the second data, and transmit the encoded and encrypted second data to the reception apparatus 600. In this way, when an error occurs in the first data received by the reception apparatus 600, the transmission apparatus 500 or 700 can re-transmit the first data to the reception apparatus 600.

In operation S570, the transmission apparatus 500 or 700 can encode the third data (e.g., the following data). When no error has occurred in the first data received by the reception apparatus 600, it is unnecessary to re-transmit the first data. Therefore, the transmission apparatus 500 or 700 can encode only the third data without the first data. In an embodiment, the encoding unit 520 or 720 can generate a third integrity value used by the reception apparatus 600 to detect an error in the third data. The encoding unit 520 or 720 can encode the third data together with the third integrity value.

Further, in operation S580, the transmission apparatus 500 or 700 can encrypt the encoded third data using the encoding unit 520 or 720 and a third cipher key, respectively. Also, in operation S590, the transmission apparatus 500 or 700 can transmit the encoded and encrypted third data to the reception apparatus 600 via the transmission terminal 532 or 732 using the transmitter 531 or 731, respectively.

In an embodiment, the first cipher key, the second cipher key, and the third cipher key can be symmetric keys. Information on the first cipher key, the second cipher key, and the third cipher key can be previously stored in each of the transmission apparatus 500 or 700 and the reception apparatus 600, but the present invention is not limited to this embodiment.

In some embodiments, to improve security of the one-way data communication, an update operation for at least one of the first cipher key, the second cipher key, and the third cipher key can be supported. In an embodiment, when an update condition for updating at least one of the first cipher key, the second cipher key, and the third cipher key is satisfied, the transmission apparatus 500 or 700 can transmit an update key to the reception apparatus 600 via the transmission terminal 532 or 732 using the transmitter 531 or 731, respectively. On the basis of the update key, at least one of the first cipher key, the second cipher key, and the third cipher key previously stored in each of the transmission apparatus 500 or 700 and the reception apparatus 600 can be updated.

Figure 11:
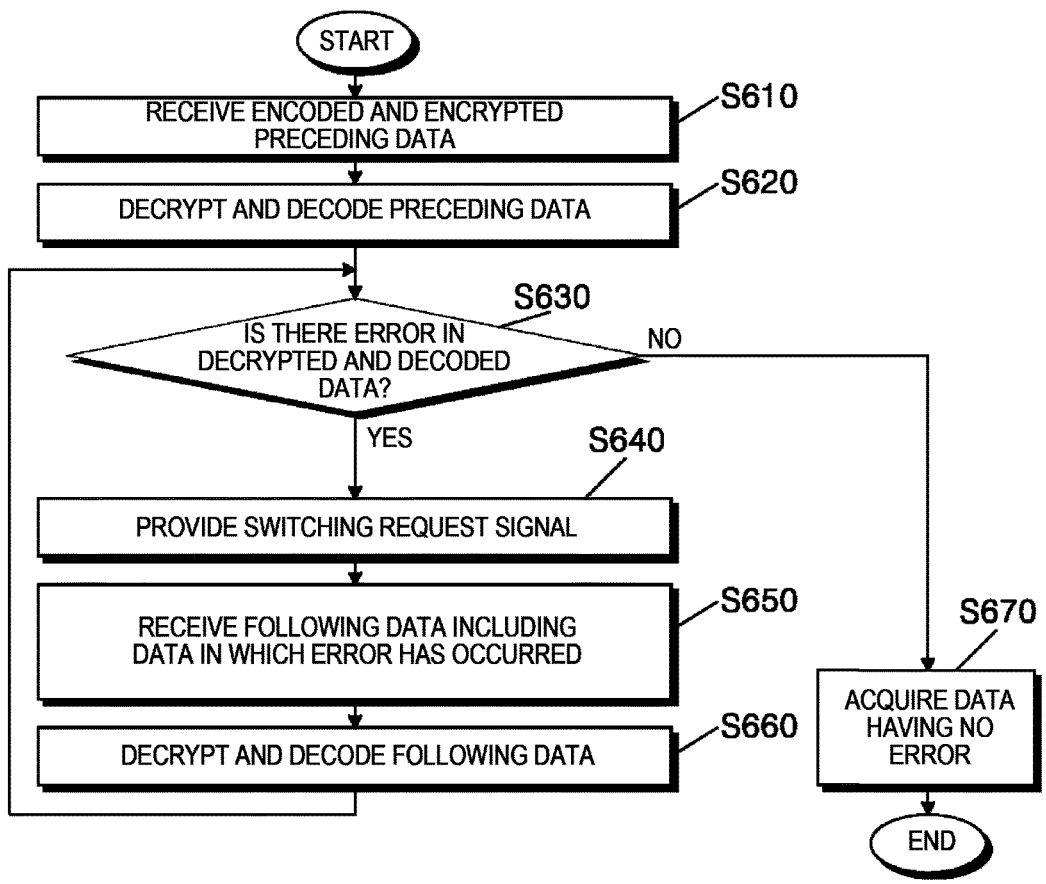
FIG. 11 is a flowchart illustrating a method of receiving data using the reception apparatus according to the embodiment of FIG. 7 or 8.

FIG. 11 is a flowchart illustrating a method of receiving data using the reception apparatus according to the embodiment of FIG. 7 or 8. For example, the method of FIG. 11 can be performed to receive data in one direction from the transmission apparatus 500 of FIG. 7 or the transmission apparatus 700 of FIG. 8 using the reception apparatus 600 of FIG. 7 or 8. To help understanding of the present invention, description will be made with reference to FIGS. 7 and 8 as well.

In operation S610, the reception apparatus 600 can receive encoded and encrypted first data (e.g., preceding data) from the transmission apparatus 500 or 700. In an embodiment, the encoded and encrypted first data can include first data and an integrity value used to detect an error in the first data. The encoded and encrypted first data can be transmitted along the one-way data transmission line L1. The reception apparatus 600 can receive the encoded and encrypted first data via the reception terminal 612 using the receiver 611.

In operation S620, the reception apparatus 600 can decrypt and decode the encoded and encrypted first data. For example, the error detection unit 620 can decrypt and decode the encoded and encrypted first data using a cipher key. In this way, the reception apparatus 600 can acquire the first data included in the encoded and encrypted first data and the integrity value corresponding to the first data.

In operation S630, the reception apparatus 600 can examine whether there is an error in the decrypted and decoded first data. More specifically, the error detection unit 620 can examine whether there is an error in the first data with reference to the integrity value. When it is determined that there is an error in the first data, operation S640 can be performed. On the other hand, when it is determined that there is no error in the first data, operation S670 can be performed.

In operation S640, the reception apparatus 600 can transmit a switching request signal to the transmission apparatus 500 or 700. The reception apparatus 600 can notify the transmission apparatus 500 or 700 of the error in the first data using the switching request signal. As mentioned above, a switching operation can be performed in the transmission apparatus 500 or 700 in response to the switching request signal and recognize the error in the transmitted first data.

In operation S650, the reception apparatus 600 can receive second data (e.g., encoded and encrypted combined data including the preceding data and following data) including the first data in which the error has occurred from the transmission apparatus 500 or 700. Further, in operation S660, the reception apparatus 600 can acquire second data included in the encoded and encrypted second data and an integrity value corresponding to the second data by decrypting and decoding the encoded and encrypted second data. In operation S630 again, the error detection unit 620 can examine whether there is an error in the second data with reference to the integrity value. In other words, in operations S640 to S660, the reception apparatus 600 can notify the transmission apparatus 500 or 700 of the data error and re-receive the data in which the error has occurred.

In operation S670, the reception apparatus 600 can acquire the data having no error. For example, the reception data buffer 640 can acquire the decrypted and decoded data that has been determined to have no error. The reception data buffer 640 can transfer the acquired data to at least one of the data collection systems 1610, 1620, and 1630 (see FIG. 1) via the one-way reception proxy 1500.

In some embodiments, to improve security of the one-way data communication, an update operation for the cipher key can be supported. In an embodiment, when an update condition for updating the cipher key is satisfied, an update key can be provided to the reception apparatus 600 via the reception terminal 612 using the receiver 611. On the basis of the update key, the cipher key used by the reception apparatus 600 can be updated.

The configurations of the apparatuses shown in the block diagrams are for helping understanding of the present invention. Each block can be formed of smaller blocks according to a function. Alternatively, a plurality of blocks can form a larger block according to a function. In other words, the technical spirit of the present invention is not limited by the configurations shown in the block diagrams.

Thus far, the present invention has been described mainly with embodiments. However, in view of the characteristics of the technical field to which the present invention pertains, the object of the present invention can be achieved in a different form from the above embodiments while including the subject matter of the present invention. Accordingly, the above embodiments should be understood not in a limitative view but in an illustrative view. That is, the technical spirit which includes the subject matter of the present invention and can achieve the same objects as the present invention should be understood to be included in the present invention.

Therefore, technical spirits variously changed and modified without departing from fundamental features of the present invention are included in the claimed scope. Also, the protective scope of the present invention should not be construed to be limited to the above embodiments.

INDUSTRIAL APPLICABILITY

The present invention relates to a transmission apparatus and a reception apparatus used in a one-way data communication system, and can provide a transmission apparatus and a reception apparatus that transmit data in one direction and operate to recognize an error in the data in response to switching of a line connection.

The invention claimed is:

1. A reception apparatus receiving target data via a uni-directional transmission wire from a transmission apparatus, the reception apparatus comprising:
   a reception unit including a reception terminal connected to the unidirectional transmission wire, a transmission terminal connected to a control signal line, a receiver receiving encoded and encrypted target data from the transmission apparatus via the reception terminal, and a switch connected between the transmission terminal and the receiver, wherein the uni-directional transmission wire and the control signal line are connected to a transmission terminal of the transmission apparatus and a reception terminal of the transmission apparatus, respectively;

an error detection unit connected to the reception unit decrypting and decoding the target data using a cipher key, examining to detect whether there is an error in the decrypted and decoded target data, wherein the error detection unit detects the error in the decrypted and decoded target data with reference to an integrity value included in the target data and outputs a control signal when the error is detected in the decrypted and decoded target data; and a switchover control unit connected between the reception unit and the error detection unit receiving the control signal from the error detection unit and controlling the switch to disconnect the control signal line in response to the control signal, wherein the switch is opened to change an electrical signal of the control signal line, and the change of the electrical signal indicates an error of the target data, wherein:

when the control signal line is disconnected, the reception unit receives a second target data, wherein the second target data includes the target data and a second integrity value generated by the transmission apparatus and re-transmitted from the transmission apparatus via the uni-directional transmission wire; and when the control signal line is connected, the reception unit receives a third target data, wherein the third target data includes a third integrity value generated by the transmission apparatus and transmitted from the transmission apparatus via the uni-directional transmission wire.

2. The reception apparatus of claim 1, wherein the reception unit further includes a transmitter being not connected to the transmission terminal.

3. The reception apparatus of claim 1, wherein, after the switch is restored under control of the switchover control unit, the reception unit receives the second target data re-transmitted and the third target data transmitted from the transmission apparatus via the uni-directional transmission wire.

4. A transmission apparatus transmitting data via a uni-directional transmission wire to a reception apparatus, the transmission apparatus comprising:

a transmission data buffer buffering a first data;

an encoding unit connected to the transmission data buffer encoding the first data together with an integrity value being used to detect an error in the first data and encrypting the encoded first data using a first cipher key;

a transmission unit connected to the encoding unit including a transmission terminal connected to uni-directional transmission wire, a reception terminal connected to a control signal line, and a transmitter transmitting the encoded and encrypted first data to the reception apparatus via the uni-directional transmission wire, wherein the uni-directional transmission wire and the control signal line are connected to a reception terminal of the reception apparatus and a transmission terminal of the reception apparatus, respectively;

a switchover sensing unit connected between the encoding unit and the transmission unit causing the reception terminal of the transmission unit to output a control signal, wherein the encoding unit receives the control signal from the switchover sensing unit indicating whether the control signal line is disconnected or connected:

when the control signal line is disconnected indicating the error in the first data, the transmission apparatus performs operations for re-transmitting the encoded and encrypted first data to the reception apparatus via the uni-directional transmission wire in response to the control signal, and when the control signal line is connected indicating no error in the first data, the transmission apparatus performs operations for transmitting encoded and encrypted second data to the reception apparatus via the uni-directional transmission wire.

5. The transmission apparatus of claim 4, wherein the transmission unit further includes a receiver being not connected to the reception terminal.

6. The transmission apparatus of claim 4, wherein the transmission data buffer further buffers a second data subsequent to the first data, wherein the encoding unit encodes combined data including the first data and the second data together with an integrity value of the combined data being used to detect an error in the combined data and encrypts the encoded combined data using a second cipher key in response to the control signal, and wherein the transmission unit transmits the encoded and encrypted combined data to the reception apparatus via the uni-directional transmission wire.

7. The transmission apparatus of claim 4, wherein the transmission data buffer further buffers a second data subsequent to the first data, wherein the encoding unit encodes the second data together with a second integrity value used to detect an error in the second data and encrypts the encoded second data using a second cipher key when the control signal line is connected, and wherein the transmission unit transmits the encoded and encrypted second data to the reception apparatus via the uni-directional transmission wire.

8. The transmission apparatus of claim 4, wherein the switchover sensing unit includes a sensing circuit configured to sense the electrical signal of the control signal line.

9. The transmission apparatus of claim 4, wherein the switchover sensor is implemented by providing the transmitter with a function of recognizing a connection state of the control signal line.

10. A method of transmitting data in one direction to a reception apparatus using a transmission apparatus, the method comprising:

acquiring, by an encoding unit, a first data from a transmission data buffer;

encoding, by an encoding unit, the first data together with a first integrity value used at the reception apparatus to detect an error in the first data;

encrypting, by the encoding unit, the encoded first data using a first cipher key;

transmitting, by a transmission terminal of a transmission unit connected to a uni-directional transmission wire, the encoded and encrypted first data to the reception apparatus via the uni-directional transmission wire;

sensing, by a switchover sensing unit connected between the transmission unit and the encoding unit, an electrical signal via the control signal line indicating whether a connection to the reception apparatus via the control signal line is connected or disconnected, wherein disconnected control signal line indicates the error of the first data and signals generating a second data including the first data, wherein connected control signal line signals acquiring a third data from the transmission data buffer to perform operations for transmitting the third data;

encoding the second data including the first data together with a second integrity value used to detect an error in the second data when it is sensed that the control signal line is disconnected;

encrypting the encoded second data using a second cipher key; and transmitting the encoded and encrypted second data to the reception apparatus via the uni-directional communication line.

11. The method of claim 10, further comprising: acquiring the third data subsequent to the first data; when it is sensed that the control signal line is connected, encoding the third data together with a third integrity value used to detect an error in the third data; encrypting the encoded third data using a third cipher key; and transmitting the encoded and encrypted third data to the reception apparatus via the uni-directional transmission wire.

12. A method of receiving data in one direction from a transmission apparatus using a reception apparatus, the method comprising:

receiving, by a reception terminal of the reception apparatus, encoded and encrypted first data from the transmission apparatus via a uni-directional transmission wire;

decrypting and decoding, by an error detection unit, the encoded and encrypted first data using a cipher key to generate a decrypted and decoded first data and acquiring an integrity value included in the decrypted and decoded first data;

examining, by the error detection unit, to detect whether there is an error in the decrypted and decoded first data with reference to the integrity value;

when it is determined that there is an error in the decrypted and decoded first data, opening, by a switchover control unit connected between the reception unit and the error detection unit, a switch between a receiver and a transmission terminal of the reception apparatus to disconnect a control signal line connected between a reception terminal of the transmission apparatus and the transmission terminal of the reception apparatus, and to signal the transmission apparatus an indication of the error in the decrypted and decoded first data via a change of an electronic signal; and when the control signal line is disconnected, receiving, by the reception terminal of the reception apparatus, encoded and encrypted second data including the first data and a second integrity value from the transmission apparatus via the uni-directional transmission wire, when the control signal line is connected, receiving, by the reception terminal of the reception apparatus, encoded and encrypted third data including a third integrity value from the transmission apparatus via the uni-directional transmission wire.

13. The method of claim 12, further comprising a reception data buffer acquiring the decrypted and decoded first data when it is determined that there is no error in the decrypted and decoded first data.

* * * * *